US011125986B2

(12) United States Patent
Tanaka et al.

(10) Patent No.: US 11,125,986 B2
(45) Date of Patent: Sep. 21, 2021

(54) ZOOM LENS AND IMAGING APPARATUS

(71) Applicant: FUJIFILM Corporation, Tokyo (JP)

(72) Inventors: Takuya Tanaka, Saitama (JP); Takuya Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 35 days.

(21) Appl. No.: 16/828,622

(22) Filed: Mar. 24, 2020

(65) Prior Publication Data
US 2020/0310086 A1 Oct. 1, 2020

(30) Foreign Application Priority Data

Mar. 26, 2019 (JP) .............................. JP2019-059476

(51) Int. Cl.
*G02B 15/14* (2006.01)
*G02B 15/173* (2006.01)

(52) U.S. Cl.
CPC ....... *G02B 15/173* (2013.01); *G02B 15/1451* (2019.08); *G02B 15/145125* (2019.08); *G02B 15/145129* (2019.08)

(58) Field of Classification Search
CPC ............ G02B 15/1451; G02B 15/1461; G02B 15/145125; G02B 15/145129
See application file for complete search history.

(56) References Cited

U.S. PATENT DOCUMENTS

| 5,917,658 | A | 6/1999 | Yamanashi |
| 2013/0201565 | A1 | 8/2013 | Yamanaka |
| 2013/0215518 | A1* | 8/2013 | Mitsuhashi .......... G02B 15/173 359/683 |
| 2017/0123195 | A1* | 5/2017 | Lee .................... G02B 15/1451 |
| 2020/0004000 | A1* | 1/2020 | Ikeda .................... G02B 15/28 |

FOREIGN PATENT DOCUMENTS

| JP | H08-234105 A | 9/1996 |
| JP | 2013-160997 A | 8/2013 |
| JP | 2016-057387 A | 4/2016 |

* cited by examiner

*Primary Examiner* — Darryl J Collins
(74) *Attorney, Agent, or Firm* — Studebaker & Brackett PC

(57) ABSTRACT

The zoom lens consists of, in order from an object side, a positive first lens group, a negative second lens group, a third lens group, a positive fourth lens group, and a positive fifth lens group. During zooming, the second lens group, the third lens group, and the fourth lens group move. The fourth lens group includes a plurality of positive lenses and a negative lens disposed on a most-image-side. Assuming that an average value of Abbe numbers in positive lenses within the fourth lens group is vdp and an Abbe number of a negative lens disposed on a most-image-side of the fourth lens group is vdn, the zoom lens satisfies a conditional expression: 0<vdp−vdn<15.

20 Claims, 12 Drawing Sheets

FIG. 2
EXAMPLE 1
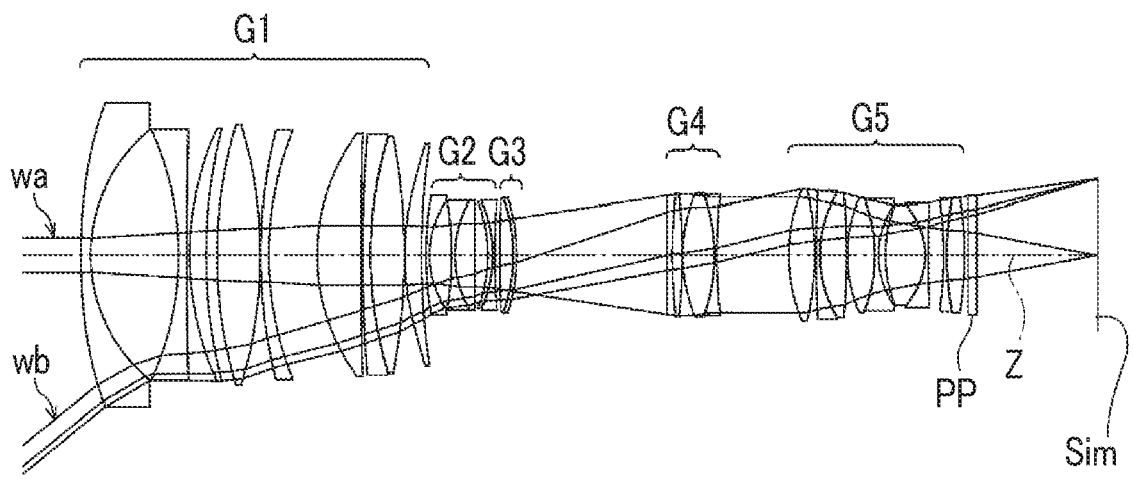
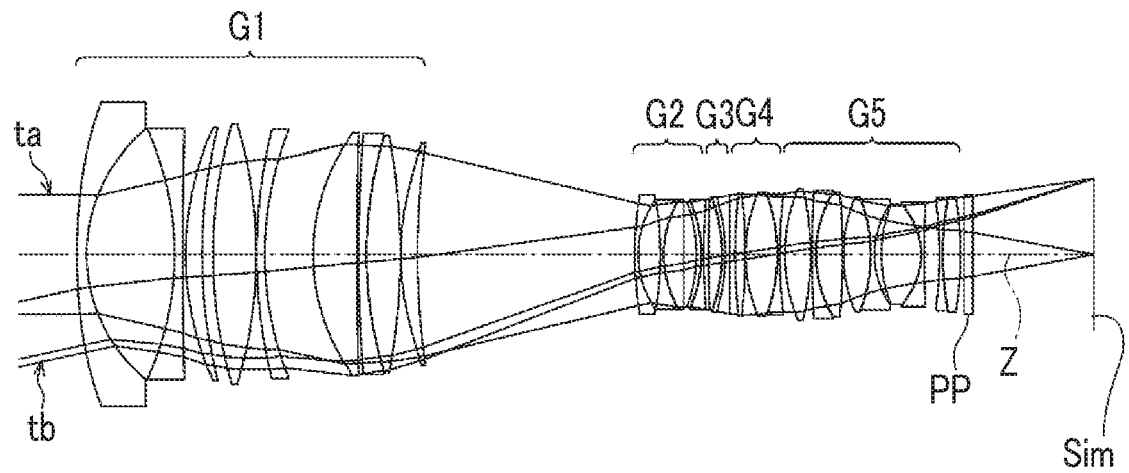

EXAMPLE 1

FIG. 5
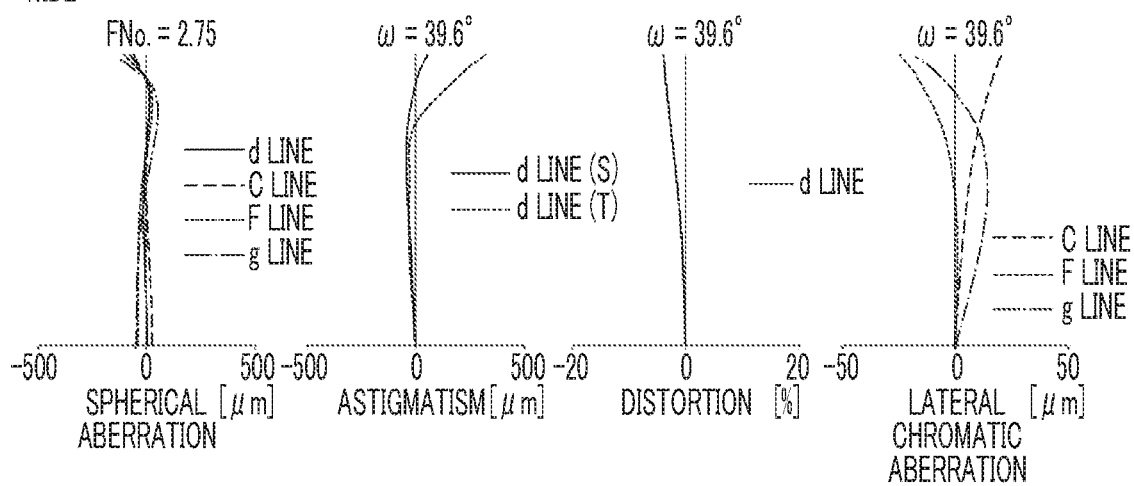
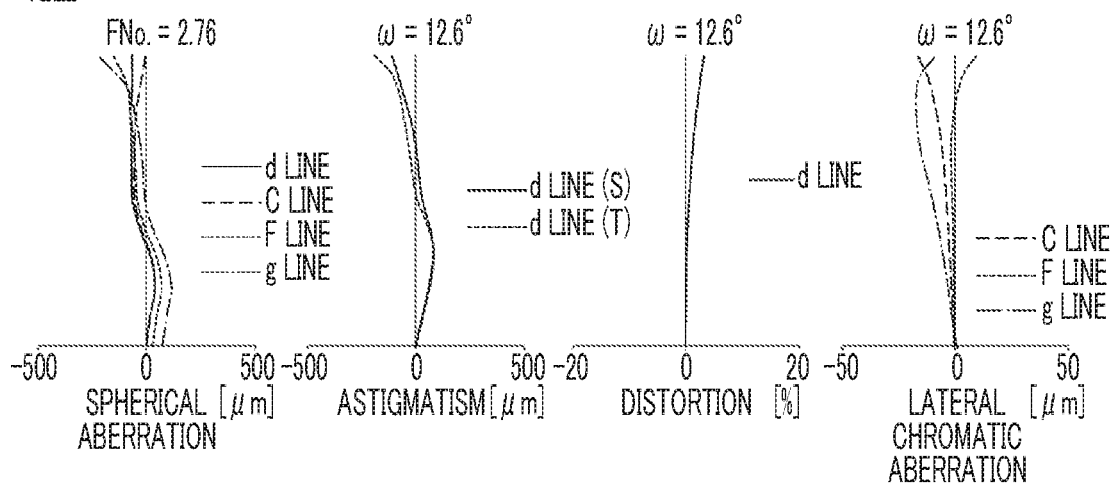

EXAMPLE 3

EXAMPLE 3

ZOOM LENS AND IMAGING APPARATUS

CROSS-REFERENCE TO RELATED APPLICATIONS

The present application claims priority under 35 U.S.C. § 119 to Japanese Patent Application No. 2019-059476, filed on Mar. 26, 2019. The above application is hereby expressly incorporated by reference, in its entirety, into the present application.

BACKGROUND OF THE INVENTION

1. Field of the Invention

The present disclosure relates to a zoom lens and an imaging apparatus.

2. Description of the Related Art

In the related art, a five-group lens system is known as a zoom lens used in a broadcast camera, a movie camera, a digital camera, and the like. For example, each of JP2016-057387A, JP2013-160997A, and JP1996-234105A (JP-H08-234105A) discloses a zoom lens which comprises, in order from an object side to an image side, a first lens group having a positive refractive power, a second lens group having a negative refractive power, a third lens group having a negative refractive power, a fourth lens group having a positive refractive power, and a fifth lens group having a positive refractive power, and in which the second lens group, the third lens group, and the fourth lens group move during zooming.

SUMMARY OF THE INVENTION

In recent years, there is an increasing demand for image definition, and the lens system is required to have high optical performance for corresponding with a pixel pitch equal to or less than the related art even in a case where the sensor size increases. However, the lens system described in each of JP2016-057387A, JP2013-160997A, and JP1996-234105A (JP-H08-234105A) has a large on-axis chromatic aberration and a large spherical aberration contrary to recent demands, and thus it cannot be said that the lens system has achieved sufficiently high optical performance.

The present disclosure has been made in view of the above circumstances, and an object thereof is to provide a zoom lens with high optical performance in which a chromatic aberration and a spherical aberration are favorably suppressed, and an imaging apparatus comprising the zoom lens.

A zoom lens according to an aspect of the present disclosure consists of, in order from an object side to an image side: a first lens group that has a positive refractive power; a second lens group that has a negative refractive power; a third lens group that has a refractive power; a fourth lens group that has a positive refractive power; and a fifth lens group that has a positive refractive power, wherein during zooming from a wide-angle end to a telephoto end, the first lens group and the fifth lens group remain stationary with respect to an image plane, the second lens group, the third lens group and the fourth lens group move along an optical axis while changing a distance with each of adjacent lens groups, wherein the fourth lens group includes at least two positive lenses and a negative lens disposed on a most-image-side, and wherein assuming that an average value of Abbe numbers of the positive lenses included in the fourth lens group based on a d line is vdp and an Abbe number of the negative lens disposed on a most-image-side of the fourth lens group based on a d line is vdn, the following Conditional Expression (1) is satisfied.

$$0 < vdp - vdn < 15 \tag{1}$$

In the zoom lens of the above described aspect, it is preferable that the following Conditional Expression (1-1) is satisfied.

$$5 < vdp - vdn < 15 \tag{1-1}$$

In the zoom lens of the above described aspect, assuming that an Abbe number of the negative lens of the fourth lens group based on a d line is vdn and a minimum value of Abbe numbers of the positive lenses included in the fourth lens group based on a d line is vdpm, it is preferable that the following Conditional Expression (2) is satisfied and it is more preferable that the following Conditional Expression (2-1) is satisfied.

$$0 < vdn - vdpm \tag{2}$$

$$2 < vdn - vdpm < 10 \tag{2-1}$$

In the zoom lens of the above described aspect, assuming that a partial dispersion ratio between a g line and an F line of the negative lens disposed on a most-image-side of the fourth lens group is θn and a partial dispersion ratio between a g line and an F line of a positive lens having a smallest Abbe number based on a d line among the positive lenses included in the fourth lens group is θpm, it is preferable that the following Conditional Expression (3) is satisfied.

$$\theta n < \theta pm \tag{3}$$

In the zoom lens of the above described aspect, assuming that a partial dispersion ratio between a g line and an F line of the negative lens disposed on a most-image-side of the fourth lens group is θn, it is preferable that the following Conditional Expression (4) is satisfied and it is more preferable that the following Conditional Expression (4-1) is satisfied.

$$0.54 < \theta n < 0.58 \tag{4}$$

$$0.56 < \theta n < 0.57 \tag{4-1}$$

In the zoom lens of the above described aspect, the third lens group may have a positive refractive power, and the third lens group may have a negative refractive power.

In the zoom lens of the above described aspect, for a configuration that the third lens group has a positive refractive power, assuming that a total number of the positive lenses included in the fourth lens group is k, a number sequentially assigned to the positive lenses included in the fourth lens group from an object side is i, and a focal length of an i-th positive lens of the fourth lens group in order from an object side is fpi, a focal length of the negative lens disposed on a most-image-side of the fourth lens group is fn, and a focal length of the fourth lens group is f4, it is preferable that the following Conditional Expression (5A) is satisfied and it is more preferable that the following Conditional Expression (5A-1) is satisfied.

$$0.6 < f4 \times \left\{ \left( \sum_{i=1}^{k} \frac{1}{fpi} \right) - \left| \frac{1}{fn} \right| \right\} < 0.8 \tag{5A}$$

-continued $$0.68 < f4 \times \left\{ \left( \sum_{i=1}^{k} \frac{1}{fpi} \right) - \left| \frac{1}{fn} \right| \right\} < 0.78 \quad (5A\text{-}1)$$

In the zoom lens of the above described aspect, for a configuration that the third lens group has a positive refractive power, assuming that a focal length of the fourth lens group is f4 and a focal length of the zoom lens at a wide-angle end in a state of being focused on an object at infinity is fw, it is preferable that the following Conditional Expression (6A) is satisfied and it is more preferable that the following Conditional Expression (6A-1) is satisfied.

$$0.1 < fw/f4 < 0.6 \quad (6A)$$

$$0.2 < fw/f4 < 0.3 \quad (6A\text{-}1)$$

In the zoom lens of the above described aspect, for a configuration that the third lens group has a negative refractive power, assuming that a total number of the positive lenses included in the fourth lens group is k, a number sequentially assigned to the positive lenses included in the fourth lens group in order from an object side is i, and a focal length of an i-th positive lens of the fourth lens group from an object side is fpi, a focal length of the negative lens disposed on a most-image-side of the fourth lens group is fn, and a focal length of the fourth lens group is f4, it is preferable that the following Conditional Expression (5B) is satisfied.

$$0.8 < f4 \times \left\{ \left( \sum_{i=1}^{k} \frac{1}{fpi} \right) - \left| \frac{1}{fn} \right| \right\} < 1 \quad (5B)$$

In the zoom lens of the above described aspect, for a configuration in which the third lens group has a negative refractive power, assuming that a focal length of the fourth lens group is f4 and a focal length of the zoom lens at a wide-angle end in a state of being focused on an object at infinity is fw, it is preferable that the following Conditional Expression (6B) is satisfied.

$$0.1 < fw/f4 < 0.6 \quad (6B)$$

In the zoom lens of the above described aspect, it is preferable that stop is disposed in the fourth lens group and a distance between the fourth lens group and the fifth lens group at a wide-angle end is longer than a distance between the fourth lens group and the fifth lens group at a telephoto end.

In the zoom lens of the above described aspect, assuming that a focal length of the first lens group is f1 and a focal length of the zoom lens at a wide-angle end in a state of being focused on an object at infinity is fw, it is preferable the following Conditional Expression (7) is satisfied.

$$0.3 < fw/f1 < 0.5 \quad (7)$$

In the zoom lens of the above described aspect, it is preferable that a positive lens disposed on a most-image-side among the positive lenses included in the fourth lens group and the negative lens disposed on a most-image-side of the fourth lens group are cemented with each other.

In the zoom lens of the above aspect of the present disclosure, the number of the negative lenses included in the fourth lens group may be one.

An imaging apparatus according to another aspect of the present disclosure comprises the zoom lens of the above described aspect of the present disclosure.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In addition, the term "~ group that has a positive refractive power" in the present specification means that the group has a positive refractive power as a whole. Likewise, the term "~ group having a negative refractive power" means that the group has a negative refractive power as a whole. The term "a lens having a positive refractive power" and the term "a positive lens" are synonymous. The term "a lens having a negative refractive power" and the term "a negative lens" are synonymous. The "lens group" is not limited to a configuration using a plurality of lenses, and may consist of only one lens.

The sign of the refractive power and the surface shape of a lens including an aspheric surface are considered in terms of the paraxial region unless otherwise noted. A compound aspheric lens (a lens which is integrally composed of a spherical lens and a film having an aspheric shape formed on the spherical lens, and functions as one aspheric lens as a whole) is not considered as a cemented lens, and is treated as a single lens.

The "focal length" used in a conditional expression is a paraxial focal length. The value used in a conditional expression is a value in the case of using a d line as a reference in a state of being focused on an object at infinity, in addition to a partial dispersion ratio. Assuming that refractive indexes of a lens with respect to a g line, an F line, and a C line are Ng, NF, and NC, respectively, a partial dispersion ratio θgF between the g line and the F line of the lens is defined as θgF=(Ng−NF)/(NF−NC). The "d line", "C line", "F line", and "g line" described in this specification are bright lines, the wavelength of the d line is 587.56 nm (nanometers), the wavelength of the C line is 656.27 nm (nanometers), the wavelength of the F line is 486.13 nm (nanometers), and the wavelength of the g line is 435.84 nm (nanometers).

According to the present disclosure, it is possible to provide a zoom lens with high optical performance in which a chromatic aberration and a spherical aberration are favorably suppressed, and an imaging apparatus comprising the zoom lens.

BRIEF DESCRIPTION OF THE DRAWINGS

FIG. 2 is a cross-sectional view showing configurations and rays of the zoom lens shown in FIG. 1 in each zoom state.

FIG. 5 shows respective aberration diagrams of the zoom lens according to Example 2 of the present disclosure.

DESCRIPTION OF THE PREFERRED EMBODIMENTS

Figure 1:
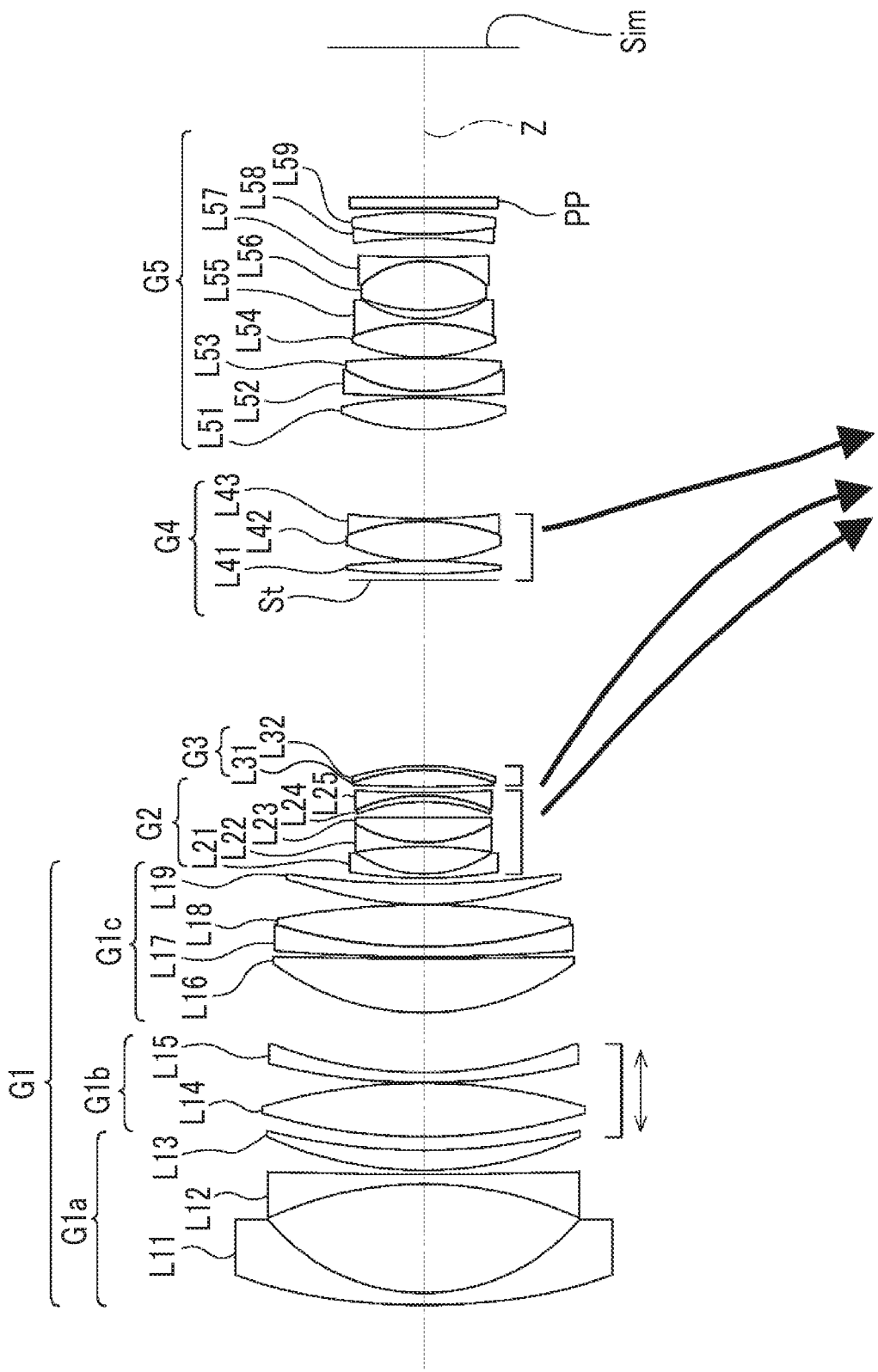
FIG. 1 is a diagram showing a cross-sectional view of a configuration of a zoom lens according to an embodiment of the present disclosure and a movement locus thereof, corresponding to a zoom lens of Example 1 of the present disclosure.

Hereinafter, embodiments of a zoom lens of the present disclosure will be described in detail with reference to the drawings. FIG. 1 is a diagram showing a cross-sectional view of a configuration and a movement locus of a zoom lens according to an embodiment of the present disclosure at a wide-angle end. FIG. 2 is a cross-sectional view showing configurations and rays of the zoom lens in each zoom state. The example shown in FIGS. 1 and 2 correspond to a zoom lens of Example 1 to be described later. FIGS. 1 and 2 show states of being focused on an object at infinity, a left side thereof is an object side, and a right side thereof is an image side. In FIG. 2, an upper part labeled by "WIDE" shows a wide-angle end state, and a lower part labeled by "TELE" shows a telephoto end state. FIG. 2 shows rays including on-axis rays wa and rays with the maximum angle of view wb in a wide-angle end state, and on-axis rays to and rays with the maximum angle of view tb in a telephoto end state. Hereinafter, description will be given mainly with reference to FIG. 1.

FIG. 1 shows an example in which, assuming that a zoom lens is applied to an imaging apparatus, an optical member PP having a parallel plate shape is disposed between the zoom lens and an image plane Sim. The optical member PP is a member assumed to include various filters, a cover glass, and/or the like. The various filters include, for example, a low pass filter, an infrared cut filter, a filter that cuts a specific wavelength region, and the like. The optical member PP has no refractive power, and in the present disclosure, the optical member PP may be omitted.

The zoom lens of the present disclosure consists of, in order from an object side to an image side along an optical axis Z, a first lens group G1 that has a positive refractive power, a second lens group G2 that has a negative refractive power, a third lens group G3 that has a refractive power, a fourth lens group G4 that has a positive refractive power, and a fifth lens group G5 that has a positive refractive power. By configuring a most-object-side first lens group G1 with a positive lens group, an overall length of a lens system can be shortened, which is advantageous for downsizing. In addition, by configuring a most-image-side fifth lens group G5 with a positive lens group, it is possible to suppress an increase in an incidence angle of a principal ray of an off-axis ray to an image plane Sim, thereby to suppress shading.

In the example shown in FIG. 1, the first lens group G1 consists of nine lenses L11 to L19 in order from an object side to an image side, the second lens group G2 consists of five lenses L21 to L25 in order from an object side to an image side, the third lens group G3 consists of two lenses L31 and L32 in order from an object side to an image side, the fourth lens group G4 consists of an aperture stop St and three lenses L41 to L43 in order from an object side to an image side, and the fifth lens group G5 consists of nine lenses L51 and L59 in order from an object side to an image side. Meanwhile, in the zoom lens of the present disclosure, the number of lenses composing each lens group may be different from the number in the example shown in FIG. 1. In addition, the aperture stop St shown in FIG. 1 does not show its shape, but shows its position in a direction of an optical axis.

In the zoom lens of the present disclosure, it is configured such that during zooming from a wide-angle end to a telephoto end, the first lens group G1 and the fifth lens group G5 remain stationary with respect to an image plane Sim, the second lens group G2, the third lens group G3 and the fourth lens group G4 move along an optical axis Z while changing a distance with each of adjacent lens groups. In FIG. 1, under the second lens group G2, the third lens group G3, and the fourth lens group G4, movement loci of the respective lens groups during zooming from a wide-angle end to a telephoto end are schematically indicated by arrows. For example, it is possible to configure such that main zooming is performed by moving the second lens group G2 having a negative refractive power, and fluctuation in an image plane position due to zooming is corrected by moving the third lens group G3 and the fourth lens group G4. Since the third lens group G3 and the fourth lens group G4 move relatively during zooming, it is easy to favorably suppress fluctuation in a field curvature during zooming and fluctuation in a spherical aberration during zooming. In addition, the first lens group G1 and the fifth lens group G5 are configured to remain stationary during zooming. In such a configuration, a distance from a most-object-side lens surface to a most-image-side lens surface does not change during zooming, and it is possible to reduce fluctuation in barycenter of a lens system. Thus, it is possible to improve the convenience at the time of imaging.

Since the zoom lens of the present disclosure has a great advantage in the fourth lens group G4, the fourth lens group G4 will be described in detail first. The fourth lens group G4 includes at least two positive lenses and a negative lens disposed on a most-image-side. By using at least two positive lenses in the fourth lens group G4, it is possible to suppress occurrence of a spherical aberration. In addition, by disposing a negative lens on a most-image-side of the fourth lens group G4, a spherical aberration and an on-axis chromatic aberration occurred in a positive lens can be corrected while suppressing a thickness of the fourth lens group G4 on the optical axis. Specifically, for example, the fourth lens group G4 can be configured to include only two or three positive lenses and one negative lens, as lenses. The configuration in which the number of the negative lenses included in the fourth lens group G4 is only one is more advantageous for downsizing than the configuration in which the number is two or more.

The zoom lens according to the present disclosure is configured such that assuming that an average value of Abbe numbers in all positive lenses included in the fourth lens group G4 based on a d line is vdp and an Abbe number of the negative lens disposed on a most-image-side of the fourth lens group G4 based on a d line is vdn, the following Conditional Expression (1) is satisfied. By not allowing the result of Conditional Expression (1) to be equal to or less than a lower limit, it is advantageous for correcting a primary on-axis chromatic aberration. By not allowing the result of Conditional Expression (1) to be equal to or greater than an upper limit, it is possible to suppress occurrence of a secondary on-axis chromatic aberration. Further, in a case of a configuration in which the following Conditional Expression (1-1) is satisfied, it is possible to obtain more favorable characteristics, and in a case of a configuration in which the following Conditional Expression (1-2) is satisfied, it is possible to obtain still more favorable characteristics.

$$0 < vdp - vdn < 15 \quad (1)$$

$$5 < vdp - vdn < 15 \quad (1-1)$$

$$9 < vdp - vdn < 14 \quad (1-2)$$

Further, assuming that an Abbe number of the negative lens disposed on a most-image-side of the fourth lens group G4 based on a d line is vdn and a minimum value of Abbe numbers of all the positive lenses included in the fourth lens group G4 based on a d line is vdpm, it is preferable that the following conditional expression (2) is satisfied. By not allowing the result of Conditional Expression (2) to be equal to or less than a lower limit, it is advantageous for correcting a secondary on-axis chromatic aberration. In addition, it is more preferable that the following Conditional Expression (2-1) is satisfied. By not allowing the result of Conditional Expression (2-1) to be equal to or less than a lower limit, it is more advantageous for correcting a secondary on-axis chromatic aberration. By not allowing the result of Conditional Expression (2-1) to be equal to or greater than an upper limit, it is easy to correct a primary on-axis chromatic aberration.

$$0 < vdn - vdpm \quad (2)$$

$$2 < vdn - vdpm < 10 \quad (2-1)$$

In addition, assuming that a partial dispersion ratio between a g line and an F line of the negative lens disposed on a most-image-side of the fourth lens group G4 is θn and a partial dispersion ratio between a g line and an F line of a positive lens having a smallest Abbe number based on a d line among the positive lenses included in the fourth lens group G4 is θpm, it is preferable that the following Conditional Expression (3) is satisfied. By satisfying Conditional Expression (3), it is advantageous for correcting a secondary on-axis chromatic aberration.

$$θn < θpm \quad (3)$$

In addition, assuming that a partial dispersion ratio between a g line and an F line of the negative lens disposed on a most-image-side of the fourth lens group G4 is θn, it is preferable that the following Conditional Expression (4) is satisfied. By not allowing the result of Conditional Expression (4) to be equal to or less than a lower limit, it is easy to select a material having an appropriate Abbe number and it is easy to correct a primary on-axis chromatic aberration. By not allowing the result of Conditional Expression (4) to be equal to or greater than an upper limit, it is easy to suppress occurrence of a secondary on-axis chromatic aberration. In addition, in a case of a configuration in which the following Conditional Expression (4-1) is satisfied, it is possible to obtain more favorable characteristics.

$$0.54 < θn < 0.58 \quad (4)$$

$$0.56 < θn < 0.57 \quad (4-1)$$

Further, it is preferable that a positive lens disposed on a most-image-side among the positive lenses included in the fourth lens group G4 and the negative lens disposed on a most-image-side of the fourth lens group G4 are cemented with each other. By taking these two lenses as a cemented lens, a spherical aberration and an on-axis chromatic aberration can be corrected while more suppressing a thickness of the fourth lens group G4 on the optical axis.

It is preferable that the aperture stop St is disposed in the fourth lens group G4, and a distance between the fourth lens group G4 and the fifth lens group G5 at a wide-angle end is longer than a distance between the fourth lens group G4 and the fifth lens group G5 at a telephoto end. In such a case, it is possible to position a position of the aperture stop St at a wide-angle end closer to the object side than a position of the aperture stop St at a telephoto end, and thus it is possible to position an entrance pupil position at a wide-angle end closer to an object side than an entrance pupil position at a telephoto end. Accordingly, it is easy to suppress increase in an outer diameter of the first lens group G1 while inhibiting an overall length of the lens system from becoming long.

The third lens group G3 may be a lens group having a positive refractive power or may be a lens group having a negative refractive power. In a case where the third lens group G3 has a positive refractive power, a refractive power of the fourth lens group G4 can be weakened, and thus performance deterioration due to tilting of the lens group and/or performance deterioration due to a manufacturing error of the lens can be suppressed. In a case where the third lens group G3 has a negative refractive power, it is advantageous for increasing a zoom ratio.

In a case where the third lens group G3 has a positive refractive power, it is preferable that the following Conditional Expression (5A) is satisfied. Further, in Conditional Expression (5A), the total number of positive lenses included in the fourth lens group G4 is k, a number sequentially assigned to the positive lenses included in the fourth lens group G4 in order from an object side is i, and a focal length of an i-th positive lens of the fourth lens group G4 from an object side is fpi, a focal length of the negative lens disposed on a most-image-side of the fourth lens group G4 is fn, and a focal length of the fourth lens group G4 is f4. By not allowing the result of Conditional Expression (5A) to be equal to or less than a lower limit, it is possible to suppress an excessive increase in thickness of the fourth lens group G4 on an optical axis. By not allowing the result of Conditional Expression (5A) to be equal to or greater than an upper limit, a refractive power of a negative lens within the fourth lens group G4 with respect to a refractive power of a positive lens within the fourth lens group G4 is prevented from becoming excessively weak. As a result, it is easy to correct a spherical aberration and an on-axis chromatic aberration. In addition, in a case of a configuration in which the following Conditional Expression (5A-1) is satisfied, it is possible to obtain more favorable characteristics.

$$0.6 < f4 \times \left\{ \left( \sum_{i=1}^{k} \frac{1}{fpi} \right) - \left| \frac{1}{fn} \right| \right\} < 0.8 \quad (5A)$$

-continued $$0.68 < f4 \times \left\{ \left( \sum_{i=1}^{k} \frac{1}{fpi} \right) - \left| \frac{1}{fn} \right| \right\} < 0.78 \tag{5A-1}$$

In addition, in a configuration in which the third lens group G3 has a positive refractive power, assuming that a focal length of the fourth lens group G4 is f4 and a focal length of the zoom lens at a wide-angle end in a state of being focused on an object at infinity is fw, it is preferable that the following Conditional Expression (6A) is satisfied. By not allowing the result of Conditional Expression (6A) to be equal to or less than a lower limit, it is possible to suppress an increase in the overall length of the lens system. By not allowing the result of Conditional Expression (6A) to be equal to or greater than an upper limit, a refractive power of the fourth lens group G4 is allowed to be prevented from becoming excessively strong. As a result, it is easy to correct a spherical aberration. In addition, in a case of a configuration in which the following Conditional Expression (6A-1) is satisfied, it is possible to obtain more favorable characteristics.

$$0.1 < fw/f4 < 0.6 \tag{6A}$$

$$0.2 < fw/f4 < 0.3 \tag{6A-1}$$

On the other hand, in a case where the third lens group G3 has a negative refractive power, it is preferable that the following Conditional Expression (5B) is satisfied. Further, in Conditional Expression (5B), the total number of the positive lenses included in the fourth lens group G4 is k, a number sequentially assigned to the positive lenses included in the fourth lens group G4 in order from an object side is i, and a focal length of an i-th positive lens of the fourth lens group G4 from an object side is fpi, a focal length of the negative lens disposed on a most-image-side of the fourth lens group G4 is fn, and a focal length of the fourth lens group G4 is f4. By not allowing the result of Conditional Expression (5B) to be equal to or less than a lower limit, it is possible to suppress an excessive increase in thickness of the fourth lens group G4 on an optical axis. By not allowing the result of Conditional Expression (5B) to be equal to or greater than an upper limit, a refractive power of a negative lens within the fourth lens group G4 with respect to a refractive power of a positive lens within the fourth lens group G4 is prevented from becoming excessively weak. As a result, it is easy to correct a spherical aberration and an on-axis chromatic aberration. In addition, in a case of a configuration in which the following Conditional Expression (5B-1) is satisfied, it is possible to obtain more favorable characteristics.

$$0.8 < f4 \times \left\{ \left( \sum_{i=1}^{k} \frac{1}{fpi} \right) - \left| \frac{1}{fn} \right| \right\} < 1 \tag{5B}$$

$$0.86 < f4 \times \left\{ \left( \sum_{i=1}^{k} \frac{1}{fpi} \right) - \left| \frac{1}{fn} \right| \right\} < 0.97 \tag{5B-1}$$

In addition, in a configuration in which the third lens group G3 has a negative refractive power, assuming that a focal length of the fourth lens group G4 is f4 and a focal length of the zoom lens at a wide-angle end in a state of being focused on an object at infinity is fw, it is preferable that the following Conditional Expression (6B) is satisfied. By not allowing the result of Conditional Expression (6B) to be equal to or less than a lower limit, it is possible to suppress an increase in the overall length of the lens system. By not allowing the result of Conditional Expression (6B) to be equal to or greater than an upper limit, a refractive power of the fourth lens group G4 is allowed to be prevented from becoming excessively strong. As a result, it is easy to correct a spherical aberration. In addition, in a case of a configuration in which the following Conditional Expression (6B-1) is satisfied, it is possible to obtain more favorable characteristics.

$$0.1 < fw/f4 < 0.6 \tag{6B}$$

$$0.45 < fw/f4 < 0.55 \tag{6B-1}$$

For the first lens group G1, assuming that a focal length of the first lens group G1 is f1 and a focal length of the zoom lens at a wide-angle end in a state of being focused on an object at infinity is fw, it is preferable the following Conditional Expression (7) is satisfied. By not allowing the result of Conditional Expression (7) to be equal to or less than a lower limit, it is possible to suppress an increase in the overall length of the lens system. By not allowing the result of Conditional Expression (7) to be equal to or greater than an upper limit, it is possible to suppress that a focal length of the first lens group G1 becomes short, that is, it is possible to suppress that a back focus length of the first lens group G1 of a case where the first lens group G1 is approximated by a thin lens. Accordingly, it is easy to take a long range in which the second lens group G2 can move during zooming, and it is easy to secure a necessary zoom ratio. In addition, in a case of a configuration in which the following Conditional Expression (7-1) is satisfied, it is possible to obtain more favorable characteristics.

$$0.3 < fw/f1 < 0.5 \tag{7}$$

$$0.35 < fw/f1 < 0.45 \tag{7-1}$$

It may be configured such that the first lens group G1 consists of, in order from an object side to an image side, a first a lens group G1a that remains stationary with respect to an image plane Sim during focusing and has a negative refractive power, a first b lens group G1b that moves along an optical axis Z during focusing and has a positive refractive power, and a first c lens group G1c that remains stationary with respect to an image plane Sim during focusing and has a positive refractive power. With such a configuration, it is easy to reduce a spherical aberration and an on-axis chromatic aberration that occur during focusing. A horizontal double-headed arrow noted below the first b lens group G1b in FIG. 1 indicates that the first b lens group G1b is a focus lens group that moves during focusing.

As an example, in the example shown in FIG. 1, the first a lens group G1a consists of three lenses L11 to L13 in order from an object side to an image side, the first b lens group G1b consists of two lenses L14 and L15 in order from an object side to an image side, and the first c lens group G1c consists of four lenses L16 to L19 in order from an object side to an image side. Meanwhile, in the zoom lens of the present disclosure, the number of lenses composing each lens group may be different from the number in the example shown in FIG. 1.

In a case where the first lens group G1 consists of the above-described first a lens group G1a, first b lens group G1b, and first c lens group G1c, it is preferably configured such that a most-image-side lens of the first b lens group G1b is a negative meniscus lens having a convex surface facing an object side, and an absolute value of a radius of curvature of a surface, of a most-object-side lens of the first c lens group G1c, on an object side is smaller than an absolute value of a radius of curvature of a surface, of the most-image-side lens of the first b lens group G1b, on an image side. By configuring the most-image-side lens of the first b lens group G1b as the above, it is easy to suppress occurrence of an astigmatism and a field curvature on a wide angle side. By configuring the surfaces of the first b lens group G1b and the first c lens group G1c, which face each other as the above, it is easy to suppress fluctuation in an off-axis aberration during focusing. In addition, since the first b lens group G1b and the first c lens group G1c do not interfere with each other at a lens edge part during focusing, it is easy to secure the amount of movement of the first b lens group G1b during focusing. In addition, it is preferable that the first b lens group G1b consists of, in order from an object side to an image side, a positive lens having a convex surface facing an object side and a negative meniscus lens having a convex surface facing an object side. In such a case, it is easy to suppress fluctuation in an off-axis aberration during focusing.

The second lens group G2 preferably has a negative lens and a cemented lens successively in order from a most object side to an image side, and the cemented lens of the second lens group G2 preferably has a configuration in which a negative lens and a positive lens are cemented to each other in order from an object side. In such a case, by disposing a plurality of negative lenses on an object side in the second lens group G2, an object side principal point position of the second lens group G2 is positioned on an object side so as to be closer to the first lens group G1, and thus a high zoom ratio can be achieved. In addition, in such a case, a lateral chromatic aberration on a wide angle side is likely to occur, and is particularly prominent in an optical system having a large image circle. Therefore, correction of a lateral chromatic aberration can be facilitated by configuring the second lens group G2 to include a cemented lens in which a negative lens and a positive lens are cemented to each other.

The above-mentioned preferred configurations and available configurations may be optional combinations, and it is preferable to selectively adopt the configurations in accordance with required specification. According to a technology of the present disclosure, it is possible to realize a zoom lens with high optical performance in which a chromatic aberration and a spherical aberration are favorably suppressed.

Next, numerical examples of the zoom lens of the present disclosure will be described.

Example 1

FIG. 1 shows a configuration and movement locus of a zoom lens of Example 1, and an illustration method and a configuration thereof is as described above. Therefore, repeated description is partially omitted herein. The zoom lens of Example 1 consists of, in order from an object side to an image side, a first lens group G1 that has a positive refractive power, a second lens group G2 that has a negative refractive power, a third lens group G3 that has a positive refractive power, a fourth lens group G4 that has a positive refractive power, and a fifth lens group G5 that has a positive refractive power. During zooming, the first lens group G1 and the fifth lens group G5 remain stationary with respect to an image plane Sim, and the second lens group G2, the third lens group G3, and the fourth lens group G4 move along an optical axis Z while changing a distance with each of adjacent lens groups. The first lens group G1 consists of, in order from an object side to an image side, a first a lens group G1a having a negative refractive power, a first b lens group G1b having a positive refractive power, and a first c lens group G1c having a positive refractive power. During focusing, only the first b lens group G1b moves along an optical axis Z, and all other lens groups remain stationary with respect to an image plane Sim. The first a lens group G1a consists of three lenses L11 to L13 in order from an object side to an image side, the first b lens group G1b consists of two lenses L14 and L15 in order from an object side to an image side, the first c lens group G1c consists of four lenses L16 to L19 in order from an object side to an image side, the second lens group G2 consists of five lenses L21 to L25 in order from an object side to an image side, the third lens group G3 consists of two lenses L31 and L32 in order from an object side to an image side, the fourth lens group G4 consists of an aperture stop St and three lenses L41 to L43 in order from an object side to an image side, and the fifth lens group G5 consists of nine lenses L51 and L59 in order from an object side to an image side. An outline of the zoom lens of Example 1 has been described above.

Regarding the zoom lens of Example 1, Tables 1A and 1B show basic lens data thereof, Table 2 shows specification and variable surface distances thereof, and Table 3 shows aspheric coefficients thereof. Here, the basic lens data is displayed to be divided into two tables of Table 1A and Table 1B in order to prevent one table from becoming long. Table 1A shows the first lens group G1, the second lens group G2, and the third lens group G3, and Table 1B shows the fourth lens group G4, the fifth lens group G5, and the optical member PP. Tables 1A, 1B, and 2 show data in a state of being focused on an object at infinity.

In Tables 1A and 1B, the column of Sn shows a surface number. A most-object-side surface is the first surface, and the surface numbers increase one by one toward an image side. The column of R shows radii of curvature of the respective surfaces. The column of D shows surface distances on an optical axis between the respective surfaces and the surfaces adjacent to an image side. The column of Nd shows a refractive index of each constituent element with respect to the d line, the column of vd shows an Abbe number of each constituent element based on the d line, and the column of θgF shows a partial dispersion ratio between the g line and the F line of each constituent element.

In Tables 1A and 1B, a sign of a radius of curvature of a surface having a convex surface facing an object side is positive and a sign of a radius of curvature of a surface having a convex surface facing an image side is negative. Table 1B also shows the aperture stop St and the optical member PP. In Table 1B, in the column of a surface number of a surface corresponding to the aperture stop St, the surface number and a term of (St) are noted. In Tables 1A and 1B, the variable surface distances during zooming are referenced by reference signs DD[ ], and are written into columns of D, where object side surface numbers of distances are noted in [ ].

In Table 2, values of a zoom ratio Zr, a focal length f, an F number FNo., a maximum total angle of view 2ω, a maximum image height IH, and a variable surface distance during zooming are shown based on the d line. (°) in the column of 2ω indicates that a unit thereof is a degree. In Table 2, values in a wide-angle end state and a telephoto end state are respectively shown in the columns labeled by WIDE and TELE.

In the basic lens data, a surface number of an aspheric surface is marked with *, and the numerical value of a paraxial radius of curvature is described in the column of a radius of curvature of the aspheric surface. In Table 3, a surface number of an aspheric surface is shown in the column of Sn, and the numerical value of the aspheric coefficient for each aspheric surface is shown in the columns of KA and Am (m is an integer of 3 or more and varies depending on the surface). The numerical value "E±n" (n: integer) of the aspheric coefficient in Table 3 means "×10$^{±n}$". KA and Am are aspheric coefficients in an aspheric expression represented by the following expression.

$$Zd = C \times h^2 / \{1 + (1 - KA \times C^2 \times h^2)^{1/2}\} + \Sigma Am \times h^m$$

Where,

Zd: aspheric depth (a length of a perpendicular line drawn from a point on an aspheric surface of a height h to a plane perpendicular to an optical axis in contact with an aspheric vertex)

h: height (a distance from an optical axis to a lens surface)

C: reciprocal of paraxial radius of curvature

KA, Am: aspheric coefficient, and $\Sigma$ in the aspheric expression means the sum of m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1A

Example 1

| Sn | R | D | Nd | vd | θgF |
|---|---|---|---|---|---|
| *1 | 182.95915 | 2.900 | 1.77250 | 49.60 | 0.55212 |
| 2 | 49.51163 | 26.465 | | | |
| 3 | −91.62241 | 2.399 | 1.55032 | 75.50 | 0.54001 |
| 4 | 1344.71083 | 0.914 | | | |
| 5 | 94.04762 | 4.917 | 1.53996 | 59.46 | 0.54418 |
| 6 | 158.65490 | 3.275 | | | |
| 7 | 140.46549 | 13.012 | 1.43700 | 95.10 | 0.53364 |
| 8 | −138.89070 | 0.126 | | | |
| 9 | 159.36792 | 2.399 | 1.84666 | 23.78 | 0.61923 |
| 10 | 101.97521 | 14.569 | | | |
| 11 | 62.95592 | 13.112 | 1.43700 | 95.10 | 0.53364 |
| 12 | 1369.37943 | 0.500 | | | |
| 13 | 461.49776 | 2.420 | 1.51823 | 58.90 | 0.54567 |
| 14 | 124.20174 | 10.143 | 1.43700 | 95.10 | 0.53364 |
| 15 | −191.30086 | 0.121 | | | |
| *16 | 79.34633 | 5.001 | 1.57135 | 52.95 | 0.55544 |
| 17 | 235.37997 | DD[17] | | | |
| *18 | 115.85199 | 1.000 | 1.90366 | 31.31 | 0.59481 |
| 19 | 29.40782 | 6.645 | | | |
| 20 | −102.25402 | 1.010 | 1.49700 | 81.54 | 0.53748 |
| 21 | 32.87300 | 6.044 | 2.00069 | 25.46 | 0.61364 |
| 22 | 37408.06790 | 3.791 | | | |
| 23 | −46.11695 | 1.530 | 1.80518 | 25.46 | 0.61572 |
| 24 | −40.53811 | 0.710 | 1.80420 | 46.50 | 0.55727 |
| 25 | 282.34052 | DD[25] | | | |
| 26 | 441.55493 | 4.011 | 1.43700 | 95.10 | 0.53364 |
| 27 | −50.68378 | 1.000 | 1.85896 | 22.73 | 0.62844 |
| 28 | −59.20285 | DD[28] | | | |

TABLE 1B

Example 1

| Sn | R | D | Nd | vd | θgF |
|---|---|---|---|---|---|
| 29(St) | ∞ | 1.500 | | | |
| 30 | 180.42526 | 3.011 | 1.88300 | 40.76 | 0.56679 |
| 31 | −179.86390 | 0.123 | | | |
| 32 | 48.47416 | 9.557 | 1.48749 | 70.24 | 0.53007 |

TABLE 1B-continued

Example 1

| Sn | R | D | Nd | vd | θgF |
|---|---|---|---|---|---|
| 33 | −54.22144 | 0.700 | 1.84850 | 43.79 | 0.56197 |
| 34 | 155.61563 | DD[34] | | | |
| 35 | 52.70086 | 7.660 | 1.53775 | 74.70 | 0.53936 |
| 36 | −93.42345 | 0.500 | | | |
| 37 | 376.49838 | 1.200 | 1.84850 | 43.79 | 0.56197 |
| 38 | 37.54054 | 8.010 | 1.84666 | 23.83 | 0.61603 |
| 39 | −203.54192 | 0.202 | | | |
| 40 | 44.31737 | 8.236 | 1.53775 | 74.70 | 0.53936 |
| 41 | −48.22318 | 1.100 | 1.80809 | 22.76 | 0.62868 |
| 42 | 27.18630 | 2.072 | | | |
| 43 | 40.91349 | 11.882 | 1.43700 | 95.10 | 0.53364 |
| 44 | −22.88129 | 1.010 | 1.65412 | 39.68 | 0.57378 |
| 45 | 421.77034 | 4.546 | | | |
| 46 | −123.74098 | 1.010 | 1.71700 | 47.93 | 0.56062 |
| 47 | 93.94119 | 5.347 | 1.80518 | 25.46 | 0.61572 |
| 48 | −106.24164 | 1.000 | | | |
| 49 | ∞ | 2.620 | 1.51680 | 64.20 | 0.53430 |
| 50 | ∞ | 36.395 | | | |

TABLE 2

Example 1

| | WIDE | TELE |
|---|---|---|
| Zr | 1.0 | 3.4 |
| f | 29.075 | 100.309 |
| FNo. | 2.75 | 2.76 |
| 2ω(°) | 79.2 | 25.2 |
| IH | 23.15 | 23.15 |
| DD[17] | 1.411 | 65.032 |
| DD[25] | 1.459 | 1.430 |
| DD[28] | 44.953 | 1.442 |
| DD[34] | 21.629 | 1.548 |

TABLE 3

Example 1

| Sn | 1 | 16 |
|---|---|---|
| KA | 1.0000000E+00 | 1.0000000E+00 |
| A4 | 3.8882182E−07 | −7.4773869E−07 |
| A6 | −9.1897088E−11 | 4.5963301E−11 |
| A8 | 7.9215941E−14 | −1.2202598E−12 |
| A10 | −8.9065753E−17 | 2.9094958E−15 |
| A12 | 8.6174771E−20 | −4.5347348E−18 |
| A14 | −5.3813067E−23 | 4.3917309E−21 |
| A16 | 1.9581146E−26 | −2.6001121E−24 |
| A18 | −3.8281388E−30 | 8.5959666E−28 |
| A20 | 3.1325341E−34 | −1.2158530E−31 |

| Sn | 18 |
|---|---|
| KA | 1.0000000E+00 |
| A4 | 2.1781857E−07 |
| A6 | 5.8392965E−10 |
| A8 | −1.0654439E−12 |
| A10 | 1.5289095E−16 |
| A12 | 3.3523411E−18 |

Figure 3:
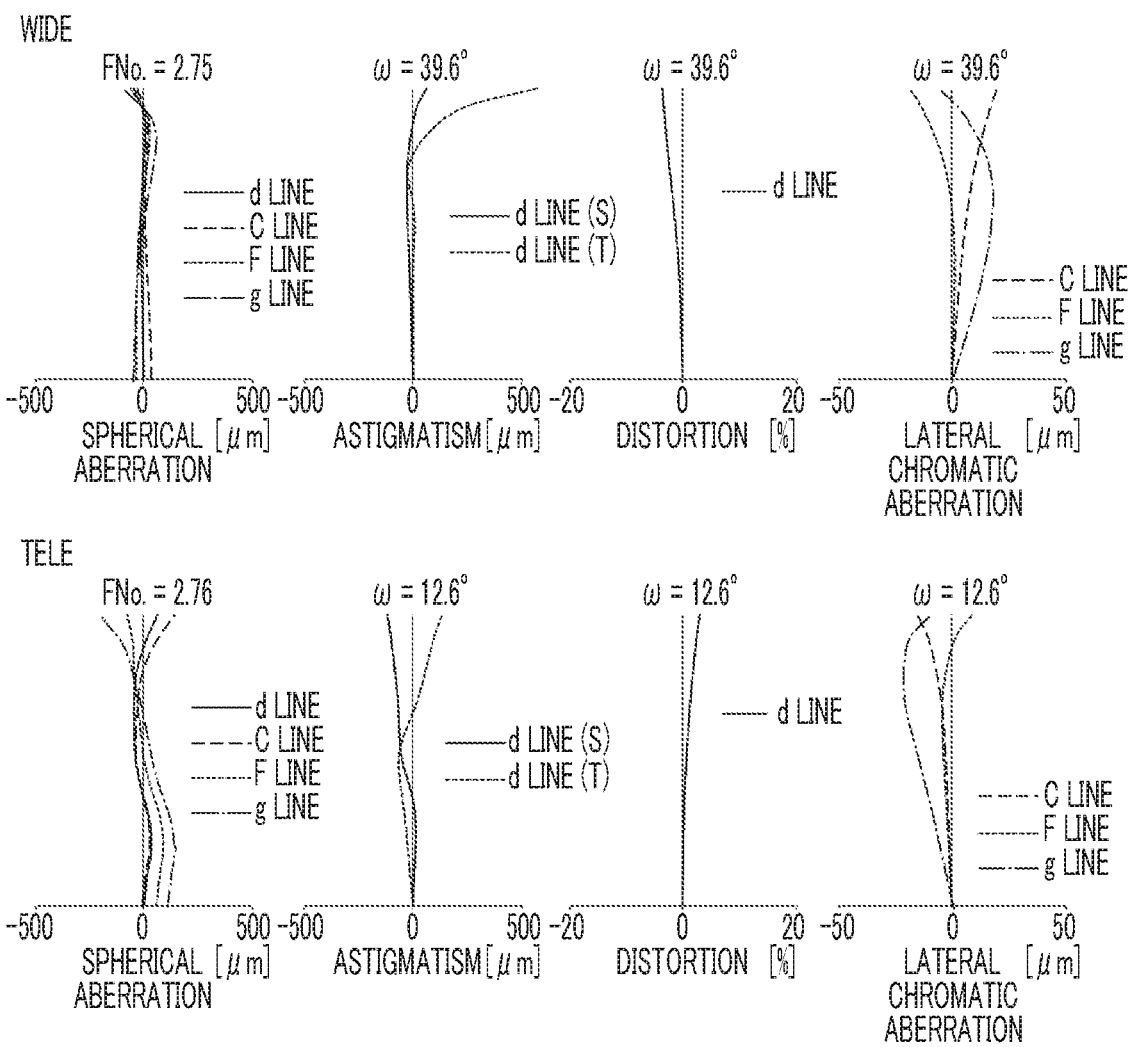
FIG. 3 shows respective aberration diagrams of the zoom lens according to Example 1 of the present disclosure.

FIG. 3 shows an aberration diagram in a state of being focused on an object at infinity through the zoom lens of Example 1. In FIG. 3, in order from a left side, a spherical aberration, an astigmatism, a distortion, and a lateral chromatic aberration are shown. In FIG. 3, an upper part labeled by "WIDE" shows an aberration in a wide-angle end state, and a lower part labeled by "TELE" shows an aberration in a telephoto end state. In the spherical aberration diagram, aberrations at the d line, the C line, the F line, and the g line are indicated by the solid line, the long dashed line, the short dashed line, and the chain line, respectively. In the astigmatism diagram, an aberration in the sagittal direction at the d line is indicated by the solid line, and an aberration in the tangential direction at the d line is indicated by the short dashed line. In the distortion diagram, an aberration at the d line is indicated by the solid line. In the lateral chromatic aberration diagram, aberrations at the C line, the F line, and the g line are respectively indicated by the long dashed line, the short dashed line, and the chain line. In the spherical aberration diagram, FNo. indicates an F number. In other aberration diagrams, ω indicates a half angle of view.

Symbols, meanings, description methods, and illustration methods of the respective data pieces according to Example 1 are the same as those in the following examples unless otherwise noted. Therefore, in the following description, repeated description will be omitted.

Example 2

Figure 4:
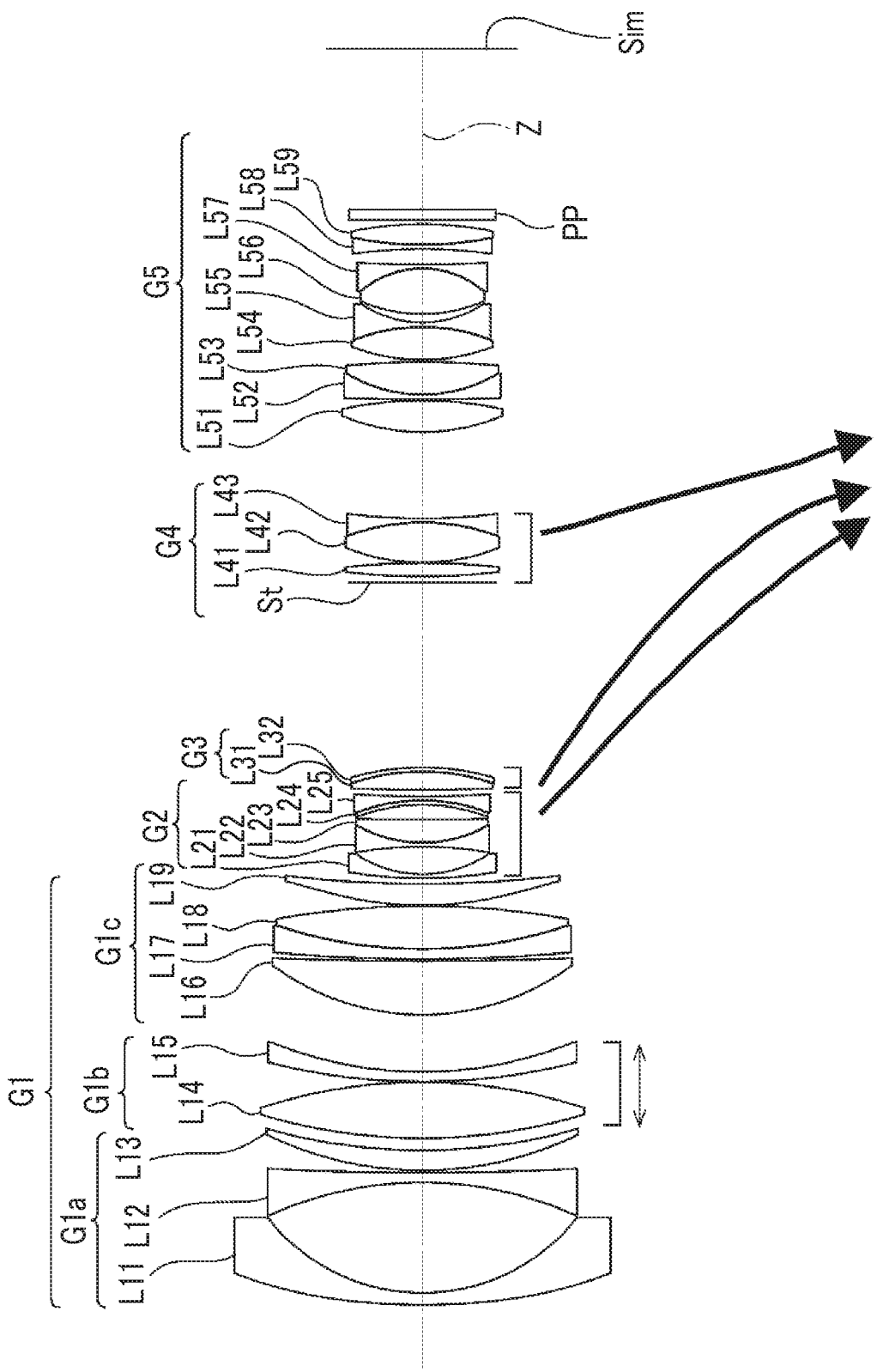
FIG. 4 is a diagram showing a cross-sectional view of a configuration of a zoom lens according to Example 2 of the present disclosure and a movement locus thereof.

FIG. 4 shows a configuration and a movement locus of the zoom lens of Example 2. The zoom lens of Example 2 has the same configuration as the outline of the zoom lens of Example 1. Regarding the zoom lens of Example 2, Tables 4A and 4B show basic lens data thereof, Table 5 shows specification and variable surface distances thereof, Table 6 shows aspheric coefficients thereof, and FIG. 5 shows aberration diagrams thereof.

TABLE 4A

Example 2

| Sn | R | D | Nd | νd | θgF |
|---|---|---|---|---|---|
| *1 | 171.58622 | 2.900 | 1.77250 | 49.60 | 0.55212 |
| 2 | 48.60432 | 26.868 | | | |
| 3 | −92.24749 | 2.399 | 1.55032 | 75.50 | 0.54001 |
| 4 | 794.16247 | 0.539 | | | |
| 5 | 88.58331 | 4.900 | 1.53996 | 59.46 | 0.54418 |
| 6 | 142.91667 | 2.952 | | | |
| 7 | 140.06699 | 13.625 | 1.43700 | 95.10 | 0.53364 |
| 8 | −129.48065 | 0.125 | | | |
| 9 | 155.09605 | 2.399 | 1.84666 | 23.78 | 0.61923 |
| 10 | 99.11860 | 13.898 | | | |
| 11 | 62.26591 | 13.052 | 1.43700 | 95.10 | 0.53364 |
| 12 | 943.90705 | 0.501 | | | |
| 13 | 421.23695 | 2.420 | 1.51823 | 58.90 | 0.54567 |
| 14 | 114.42899 | 10.473 | 1.43700 | 95.10 | 0.53364 |
| 15 | −202.76376 | 0.121 | | | |
| *16 | 80.53034 | 5.290 | 1.57099 | 50.80 | 0.55887 |
| 17 | 291.98535 | DD[17] | | | |
| *18 | 111.49447 | 1.000 | 1.90366 | 31.31 | 0.59481 |
| 19 | 29.39525 | 6.687 | | | |
| 20 | −97.12212 | 1.010 | 1.49700 | 81.54 | 0.53748 |
| 21 | 33.12921 | 5.643 | 2.00069 | 25.46 | 0.61364 |
| 22 | 2505.01645 | 3.554 | | | |
| 23 | −44.46811 | 1.050 | 1.75520 | 27.51 | 0.61033 |
| 24 | −44.87195 | 1.010 | 1.75500 | 52.32 | 0.54757 |
| 25 | 297.80535 | DD[25] | | | |
| 26 | 502.32185 | 4.418 | 1.43700 | 95.10 | 0.53364 |
| 27 | −53.91016 | 1.000 | 1.85896 | 22.73 | 0.62844 |
| 28 | −62.72133 | DD[28] | | | |

TABLE 4B

Example 2

| Sn | R | D | Nd | νd | θgF |
|---|---|---|---|---|---|
| 29(St) | ∞ | 1.500 | | | |
| 30 | 163.51214 | 3.228 | 1.88300 | 40.76 | 0.56679 |

TABLE 4B-continued

Example 2

| Sn | R | D | Nd | νd | θgF |
|---|---|---|---|---|---|
| 31 | −177.57459 | 0.121 | | | |
| 32 | 50.20348 | 9.749 | 1.48749 | 70.24 | 0.53007 |
| 33 | −53.52075 | 1.000 | 1.84850 | 43.79 | 0.56197 |
| 34 | 149.20656 | DD[34] | | | |
| 35 | 51.15807 | 7.640 | 1.55032 | 75.50 | 0.54001 |
| 36 | −92.60719 | 0.248 | | | |
| 37 | 470.64212 | 1.200 | 1.84850 | 43.79 | 0.56197 |
| 38 | 35.76560 | 7.903 | 1.84666 | 23.83 | 0.61603 |
| 39 | −204.26511 | 0.555 | | | |
| 40 | 47.83400 | 8.009 | 1.55032 | 75.50 | 0.54001 |
| 41 | −45.23300 | 1.100 | 1.80809 | 22.76 | 0.62868 |
| 42 | 27.03128 | 2.050 | | | |
| 43 | 38.27639 | 11.072 | 1.43700 | 95.10 | 0.53364 |
| 44 | −23.27462 | 1.010 | 1.67300 | 38.26 | 0.57580 |
| 45 | 347.41025 | 3.766 | | | |
| 46 | −120.65944 | 1.010 | 1.71700 | 47.93 | 0.56062 |
| 47 | 85.26234 | 5.001 | 1.80518 | 25.43 | 0.61027 |
| 48 | −88.10932 | 1.000 | | | |
| 49 | ∞ | 2.620 | 1.51680 | 64.20 | 0.53430 |
| 50 | ∞ | 39.063 | | | |

TABLE 5

Example 2

| | WIDE | TELE |
|---|---|---|
| Zr | 1.0 | 3.4 |
| f | 29.096 | 100.381 |
| FNo. | 2.75 | 2.76 |
| 2ω(°) | 79.2 | 25.2 |
| IH | 23.15 | 23.15 |
| DD[17] | 1.344 | 64.268 |
| DD[25] | 1.600 | 1.587 |
| DD[28] | 44.784 | 1.376 |
| DD[34] | 21.048 | 1.545 |

TABLE 6

Example 2

| Sn | 1 | 16 |
|---|---|---|
| KA | 1.0000000E+00 | 1.0000000E+00 |
| A4 | 3.5933650E−07 | −7.6563146E−07 |
| A6 | −4.8148986E−11 | 1.7616641E−10 |
| A8 | 4.7571920E−14 | −1.7503423E−12 |
| A10 | −8.4335808E−17 | 4.1820116E−15 |
| A12 | 9.4923671E−20 | −6.4623949E−18 |
| A14 | −6.1620585E−23 | 6.2313186E−21 |
| A16 | 2.2789967E−26 | −3.6729283E−24 |
| A18 | −4.5097713E−30 | 1.2086819E−27 |
| A20 | 3.7311725E−34 | −1.7013191E−31 |

| Sn | 18 |
|---|---|
| KA | 1.0000000E+00 |
| A4 | 3.0181759E−07 |
| A6 | −7.7257062E−10 |
| A8 | 6.1416226E−12 |
| A10 | −1.7897192E−14 |
| A12 | 2.1885381E−17 |

Example 3

Figure 6:
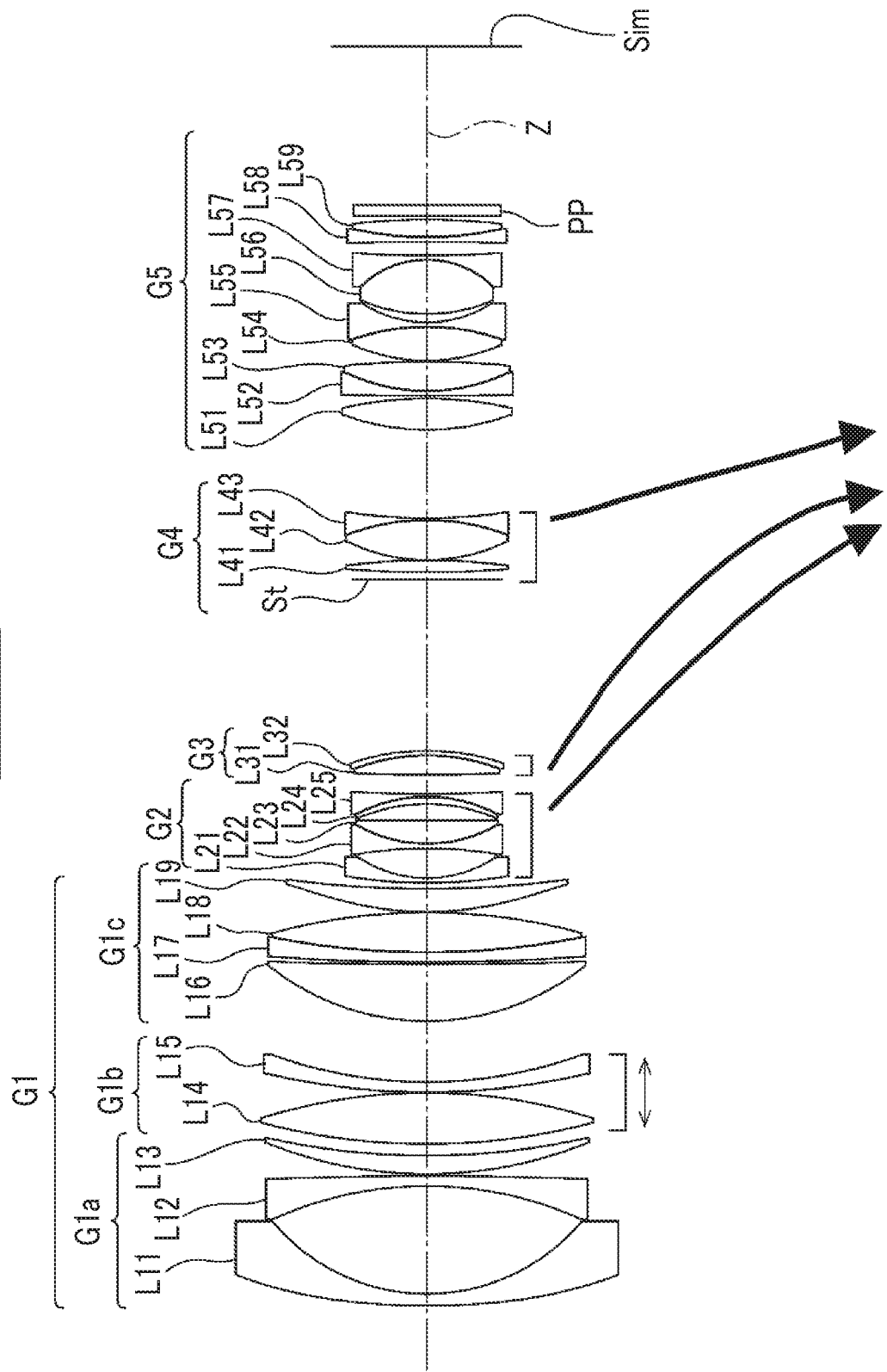
FIG. 6 is a diagram showing a cross-sectional view of a configuration of a zoom lens according to Example 3 of the present disclosure and a movement locus thereof.
Figure 7:
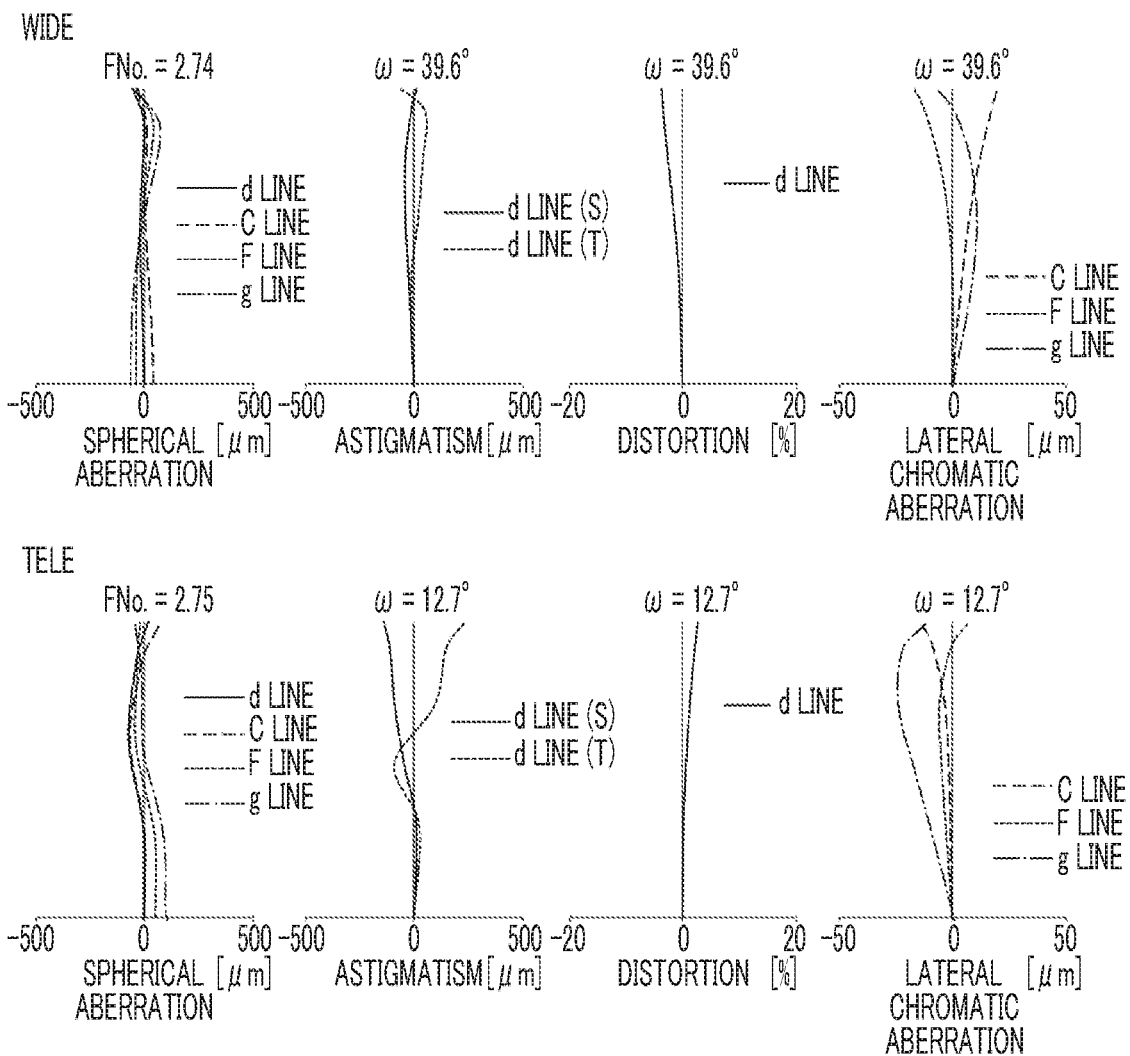
FIG. 7 shows respective aberration diagrams of the zoom lens according to Example 3 of the present disclosure.

FIG. 6 shows a configuration and a movement locus of the zoom lens of Example 3. The zoom lens of Example 3 has the same configuration as the outline of the zoom lens of Example 1. Regarding the zoom lens of Example 3, Tables 7A and 7B show basic lens data thereof, Table 8 shows specification and variable surface distances thereof, Table 9 shows aspheric coefficients thereof, and FIG. 7 shows aberration diagrams thereof.

TABLE 7A

Example 3

| Sn | R | D | Nd | vd | θgF |
|---|---|---|---|---|---|
| *1 | 191.78045 | 2.900 | 1.77250 | 49.60 | 0.55212 |
| 2 | 49.74501 | 26.241 | | | |
| 3 | −92.58733 | 2.400 | 1.61800 | 63.33 | 0.54414 |
| 4 | −1130.51571 | 0.528 | | | |
| 5 | 106.37599 | 4.460 | 1.56732 | 42.84 | 0.57814 |
| 6 | 179.15187 | 2.842 | | | |
| 7 | 163.36873 | 12.490 | 1.43700 | 95.10 | 0.53364 |
| 8 | −137.01357 | 0.130 | | | |
| 9 | 173.88007 | 2.460 | 1.84666 | 23.78 | 0.61923 |
| 10 | 111.63652 | 14.847 | | | |
| 11 | 62.88399 | 13.780 | 1.43700 | 95.10 | 0.53364 |
| 12 | 1082.06862 | 0.562 | | | |
| 13 | 535.23816 | 2.400 | 1.84850 | 43.79 | 0.56197 |
| 14 | 197.48900 | 9.710 | 1.43700 | 95.10 | 0.53364 |
| 15 | −146.18434 | 0.144 | | | |
| *16 | 75.79741 | 5.610 | 1.57099 | 50.80 | 0.55887 |
| 17 | 260.59055 | DD[17] | | | |
| *18 | 120.98200 | 1.190 | 1.90366 | 31.31 | 0.59481 |
| 19 | 30.39833 | 7.220 | | | |
| 20 | −102.70774 | 1.150 | 1.55032 | 75.50 | 0.54001 |
| 21 | 34.67200 | 5.680 | 2.05090 | 26.94 | 0.60519 |
| 22 | ∞ | 3.951 | | | |
| 23 | −43.47989 | 1.780 | 1.75520 | 27.51 | 0.61033 |
| 24 | −36.81800 | 0.710 | 1.75500 | 52.32 | 0.54757 |
| 25 | 328.63635 | DD[25] | | | |
| 26 | 435.59798 | 4.710 | 1.43700 | 95.10 | 0.53364 |
| 27 | −50.07700 | 1.140 | 1.80518 | 25.46 | 0.61572 |
| 28 | −59.18006 | DD[28] | | | |

TABLE 7B

Example 3

| Sn | R | D | Nd | vd | θgF |
|---|---|---|---|---|---|
| 29(St) | ∞ | 1.680 | | | |
| 30 | 250.78233 | 2.900 | 1.89190 | 37.13 | 0.57813 |
| 31 | −160.07896 | 0.118 | | | |
| 32 | 44.93882 | 9.700 | 1.48749 | 70.24 | 0.53007 |
| 33 | −55.70700 | 0.500 | 1.84850 | 43.79 | 0.56197 |
| 34 | 137.68892 | DD[34] | | | |
| 35 | 59.79724 | 7.590 | 1.59349 | 67.00 | 0.53667 |
| 36 | −93.44633 | 0.663 | | | |
| 37 | 920.02516 | 1.200 | 1.84850 | 43.79 | 0.56197 |
| 38 | 46.89400 | 7.150 | 1.84666 | 23.83 | 0.61603 |
| 39 | −199.62733 | 0.243 | | | |
| 40 | 45.04781 | 8.220 | 1.53775 | 74.70 | 0.53936 |
| 41 | −55.70700 | 1.080 | 1.84666 | 23.78 | 0.61923 |
| 42 | 29.26807 | 2.057 | | | |
| 43 | 41.21920 | 13.190 | 1.43700 | 95.10 | 0.53364 |
| 44 | −23.31400 | 1.010 | 1.65412 | 39.68 | 0.57378 |
| 45 | 233.59096 | 3.361 | | | |
| 46 | −637.99182 | 1.140 | 1.71700 | 47.93 | 0.56062 |
| 47 | 83.53500 | 4.220 | 1.80518 | 25.46 | 0.61572 |
| 48 | −165.35896 | 1.000 | | | |
| 49 | ∞ | 2.620 | 1.51680 | 64.20 | 0.53430 |
| 50 | ∞ | 38.591 | | | |

TABLE 8

Example 3

| | WIDE | TELE |
|---|---|---|
| Zr | 1.0 | 3.4 |
| f | 29.022 | 100.124 |

TABLE 8-continued

Example 3

| | WIDE | TELE |
|---|---|---|
| FNo. | 2.74 | 2.75 |
| 2ω(°) | 79.2 | 25.4 |
| IH | 23.15 | 23.15 |
| DD[17] | 1.442 | 64.241 |
| DD[25] | 4.648 | 1.513 |
| DD[28] | 41.553 | 1.616 |
| DD[34] | 21.503 | 1.776 |

TABLE 9

Example 3

| Sn | 1 | 16 | 18 |
|---|---|---|---|
| KA | 1.0000000E+00 | 1.0000000E+00 | 1.0000000E+00 |
| A4 | 4.3000648E−07 | −7.3930517E−07 | 2.6473383E−07 |
| A6 | −8.2443888E−11 | −1.3102806E−10 | −6.1756994E−10 |
| A8 | 4.3152167E−14 | −2.4791192E−13 | 7.9388612E−12 |
| A10 | −1.8637084E−17 | 1.9703935E−16 | −3.7050620E−14 |
| A12 | 4.7880576E−21 | −1.2514383E−19 | 9.0322833E−17 |
| A14 | −6.0499240E−25 | 2.3601526E−23 | −8.8523756E−20 |
| A16 | 9.5140393E−31 | 4.0913921E−28 | 1.7732453E−25 |
| A18 | 1.3245182E−32 | 6.7513066E−32 | −1.1012843E−27 |
| A20 | −2.2181143E−36 | 2.1146376E−36 | 2.9369501E−33 |

Example 4

Figure 8:
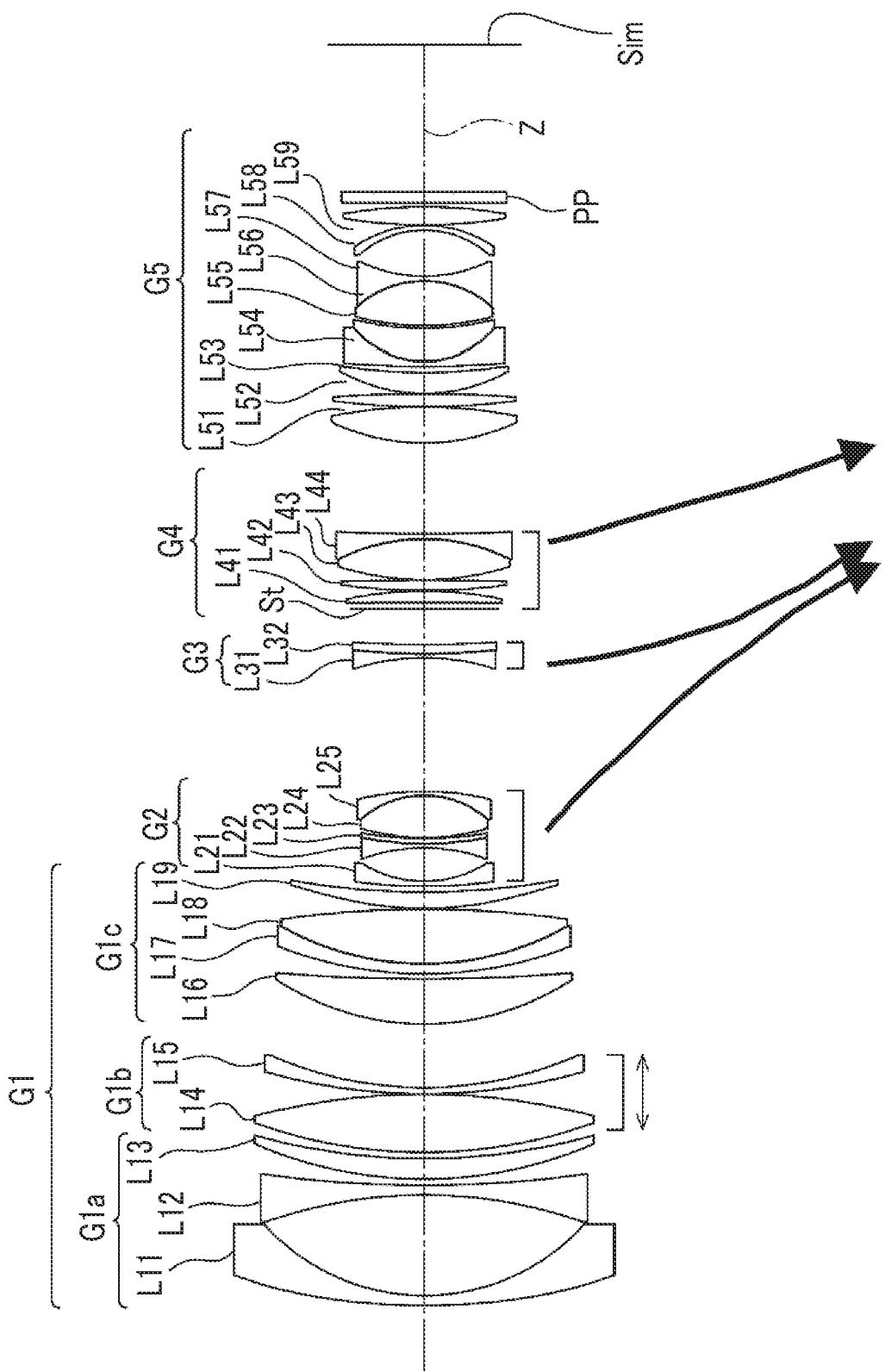
FIG. 8 is a diagram showing a cross-sectional view of a configuration of a zoom lens according to Example 4 of the present disclosure and a movement locus thereof.
Figure 9:
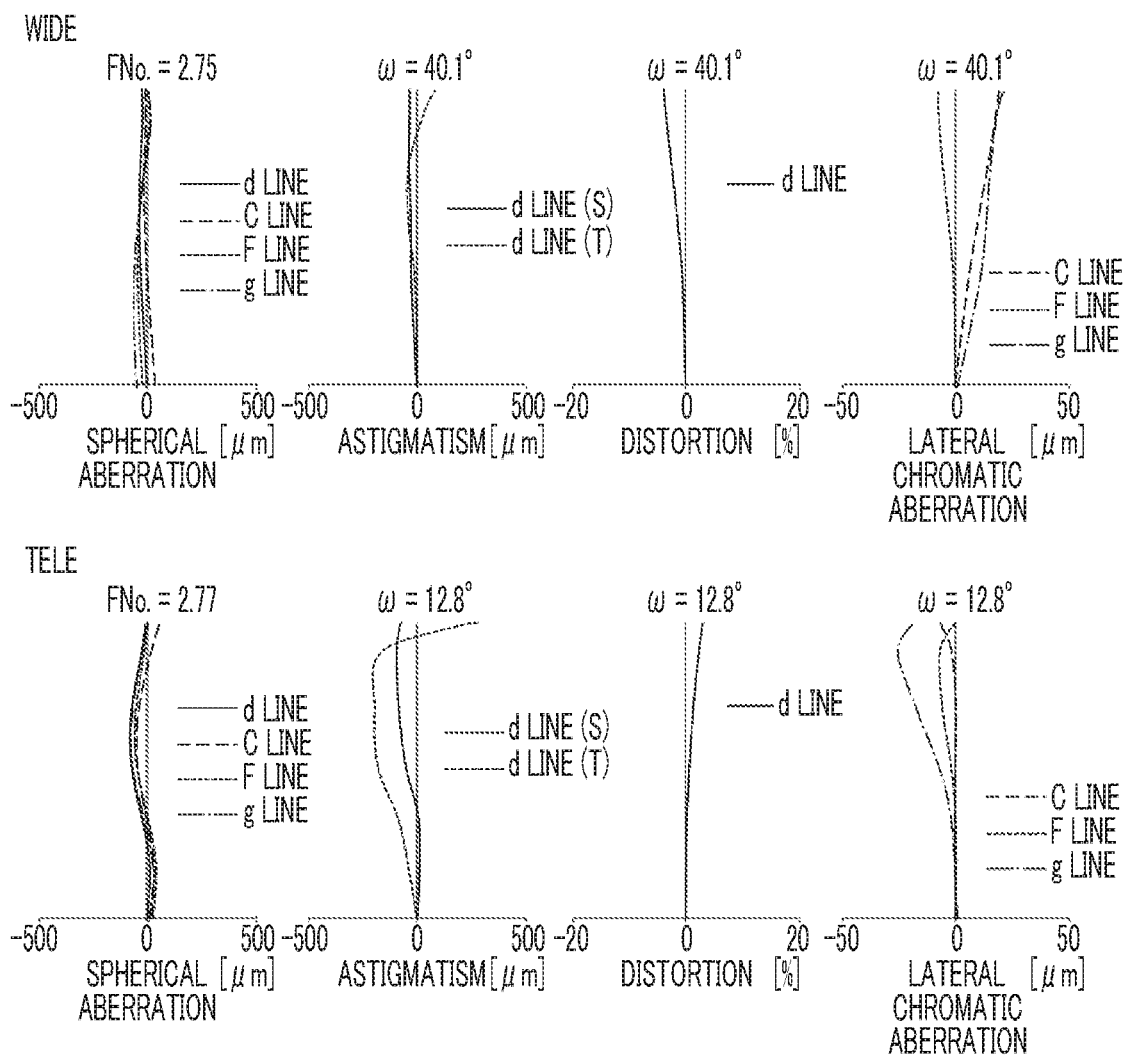
FIG. 9 shows respective aberration diagrams of the zoom lens according to Example 4 of the present disclosure.

FIG. 8 shows a configuration and a movement locus of the zoom lens of Example 4. The zoom lens of Example 4 has the same configuration as the outline of the zoom lens of Example 1 except that the third lens group G3 has a negative refractive power and the fourth lens group G4 consists of an aperture stop St and four lenses L41 to L44 in order from an object side to an image side. Regarding the zoom lens of Example 4, Tables 10A and 10B show basic lens data thereof, Table 11 shows specification and variable surface distances thereof, Table 12 shows aspheric coefficients thereof, and FIG. 9 shows aberration diagrams thereof.

TABLE 10A

Example 4

| Sn | R | D | Nd | vd | θgF |
|---|---|---|---|---|---|
| *1 | 179.40446 | 2.401 | 1.80610 | 33.27 | 0.58845 |
| 2 | 53.12829 | 24.423 | | | |
| 3 | −118.61394 | 2.400 | 1.61800 | 63.33 | 0.54414 |
| 4 | 297.65197 | 1.476 | | | |
| 5 | 104.98393 | 4.999 | 1.85478 | 24.80 | 0.61232 |
| 6 | 156.30951 | 1.491 | | | |
| 7 | 124.08605 | 14.124 | 1.43700 | 95.10 | 0.53364 |
| 8 | −165.27881 | 0.120 | | | |
| 9 | 145.94039 | 1.500 | 1.80518 | 25.46 | 0.61572 |
| 10 | 94.45591 | 15.234 | | | |
| 11 | 66.28029 | 10.971 | 1.43700 | 95.10 | 0.53364 |
| 12 | 459.46902 | 1.199 | | | |
| 13 | 99.05893 | 2.419 | 1.56732 | 42.82 | 0.57309 |
| 14 | 71.59016 | 13.255 | 1.43700 | 95.10 | 0.53364 |
| 15 | −258.08644 | 0.200 | | | |
| *16 | 81.42063 | 4.000 | 1.59551 | 39.24 | 0.58043 |
| 17 | 189.05194 | DD[17] | | | |
| *18 | 144.97847 | 1.200 | 1.77250 | 49.60 | 0.55212 |
| 19 | 28.55789 | 8.123 | | | |
| 20 | −43.47029 | 1.010 | 1.59282 | 68.62 | 0.54414 |
| 21 | 78.74006 | 1.301 | 2.00100 | 29.13 | 0.59952 |
| 22 | 92.67835 | 0.200 | | | |

TABLE 10A-continued

Example 4

| Sn | R | D | Nd | vd | θgF |
|---|---|---|---|---|---|
| 23 | 55.69741 | 10.209 | 1.71736 | 29.52 | 0.60483 |
| 24 | −23.46498 | 1.000 | 2.00100 | 29.13 | 0.59952 |
| 25 | −68.73935 | DD[25] | | | |
| 26 | −56.13694 | 1.009 | 1.49700 | 81.54 | 0.53748 |
| 27 | 168.95596 | 2.249 | 1.89286 | 20.36 | 0.63944 |
| 28 | 282.07846 | DD[28] | | | |

TABLE 10B

Example 4

| Sn | R | D | Nd | vd | θgF |
|---|---|---|---|---|---|
| 29(St) | ∞ | 1.484 | | | |
| 30 | −1404.19230 | 2.799 | 1.91082 | 35.25 | 0.58224 |
| 31 | −91.67441 | 0.119 | | | |
| 32 | 151.78541 | 2.456 | 1.59282 | 68.62 | 0.54414 |
| 33 | −1033.62353 | 0.120 | | | |
| 34 | 69.35987 | 9.964 | 1.59282 | 68.62 | 0.54414 |
| 35 | −46.83861 | 1.199 | 1.84850 | 43.79 | 0.56197 |
| 36 | 419.78193 | DD[36] | | | |
| 37 | 53.91977 | 8.686 | 1.43700 | 95.10 | 0.53364 |
| 38 | −120.81720 | 0.120 | | | |
| 39 | 181.74734 | 3.076 | 1.85896 | 22.73 | 0.62844 |
| 40 | −340.11411 | 0.120 | | | |
| 41 | 42.06962 | 5.049 | 1.62041 | 60.29 | 0.54266 |
| 42 | 134.06504 | 1.508 | | | |
| 43 | 246.84465 | 1.200 | 1.91082 | 35.25 | 0.58224 |
| 44 | 22.29736 | 7.920 | 1.58913 | 61.13 | 0.54067 |
| 45 | 72.11072 | 0.603 | | | |
| 46 | 66.34603 | 10.805 | 1.72916 | 54.68 | 0.54451 |
| 47 | −24.77020 | 1.200 | 1.85883 | 30.00 | 0.59793 |
| 48 | 36.46723 | 11.137 | | | |
| 49 | −24.14321 | 1.199 | 1.80518 | 25.46 | 0.61572 |
| 50 | −30.40404 | 0.120 | | | |
| 51 | 123.45783 | 4.380 | 1.80518 | 25.46 | 0.61572 |
| 52 | −116.53619 | 1.000 | | | |
| 53 | ∞ | 2.620 | 1.51680 | 64.20 | 0.53430 |
| 54 | ∞ | 35.771 | | | |

TABLE 11

Example 4

| | WIDE | TELE |
|---|---|---|
| Zr | 1.0 | 3.4 |
| f | 28.988 | 100.007 |
| FNo. | 2.75 | 2.77 |
| 2ω(°) | 80.2 | 25.6 |
| IH | 23.15 | 23.15 |
| DD[17] | 1.418 | 58.456 |
| DD[25] | 32.446 | 2.807 |
| DD[28] | 8.706 | 1.917 |
| DD[36] | 22.136 | 1.526 |

TABLE 12

Example 4

| Sn | 1 |
|---|---|
| KA | 1.0000000E+00 |
| A3 | 0.0000000E+00 |
| A4 | 4.5312022E−07 |
| A5 | −2.1153428E−08 |
| A6 | 1.2109683E−09 |
| A7 | −3.5047863E−11 |
| A8 | 3.2995463E−13 |

TABLE 12-continued

Example 4

| | |
|---|---|
| A9 | 7.4716711E−15 |
| A10 | −2.5204068E−16 |
| A11 | 3.2023101E−18 |
| A12 | −6.5183205E−20 |
| A13 | 2.5926591E−21 |
| A14 | −5.9075748E−23 |
| A15 | 6.5226625E−25 |
| A16 | −2.8380994E−27 |

| Sn | 16 | 18 |
|---|---|---|
| KA | 1.0000000E+00 | 1.0000000E+00 |
| A3 | −3.6590163E−07 | 2.4032717E−06 |
| A4 | −7.7052676E−07 | 1.5176659E−06 |
| A5 | 1.7642298E−08 | −1.2061942E−07 |
| A6 | −1.5100805E−09 | 2.0321330E−08 |
| A7 | 5.4051346E−11 | −1.5276666E−09 |
| A8 | −1.4701374E−12 | 7.7626452E−11 |
| A9 | 2.2899010E−14 | −2.6505983E−12 |
| A10 | −1.9240653E−16 | 5.2198549E−14 |

Example 5

Figure 10:
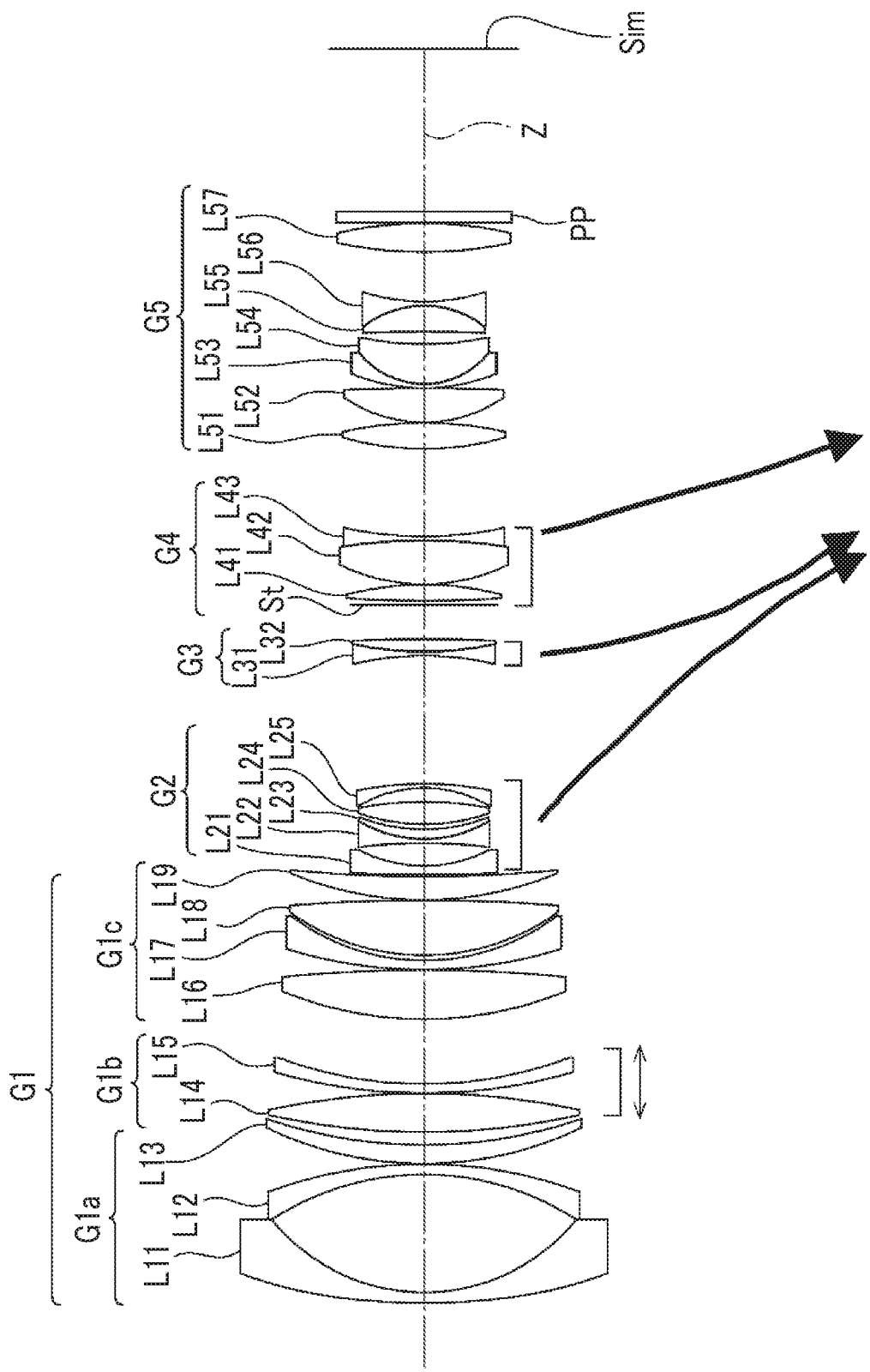
FIG. 10 is a diagram showing a cross-sectional view of a configuration of a zoom lens according to Example 5 of the present disclosure and a movement locus thereof.
Figure 11:
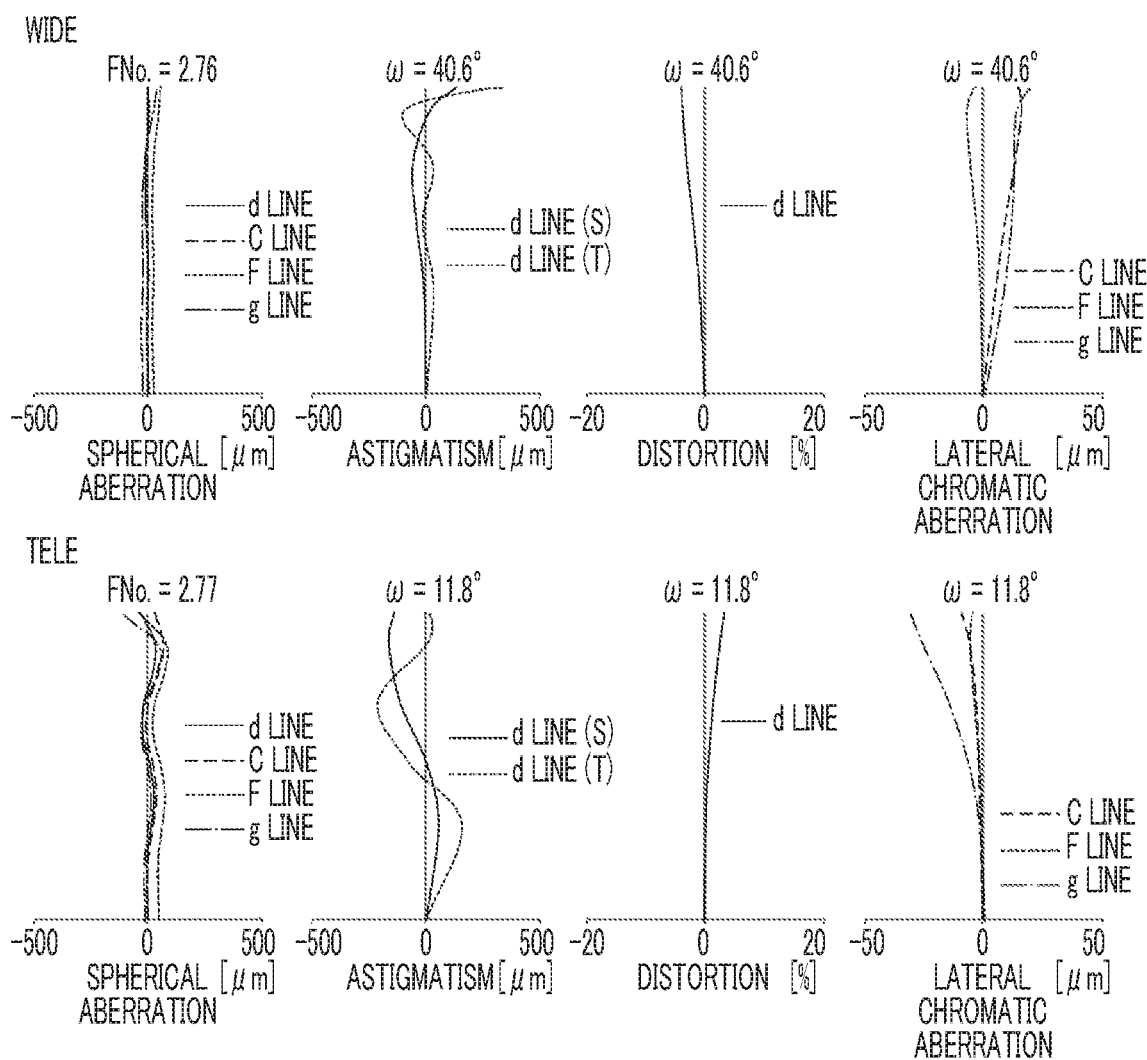
FIG. 11 shows respective aberration diagrams of the zoom lens according to Example 5 of the present disclosure.

FIG. 10 shows a configuration and a movement locus of the zoom lens of Example 5. The zoom lens of Example 5 has the same configuration as the outline of the zoom lens of Example 1 except that the third lens group G3 has a negative refractive power and the fifth lens group G5 consists of seven lenses L51 to L57 in order from an object side to an image side. Regarding the zoom lens of Example 5, Tables 13A and 13B show basic lens data thereof, Table 14 shows specification and variable surface distances thereof, Table 15 shows aspheric coefficients thereof, and FIG. 11 shows aberration diagrams thereof.

TABLE 13A

Example 5

| Sn | R | D | Nd | vd | θgF |
|---|---|---|---|---|---|
| *1 | 185.08110 | 2.500 | 1.84850 | 43.79 | 0.56197 |
| 2 | 49.11741 | 28.570 | | | |
| 3 | −70.70626 | 2.500 | 1.69560 | 59.05 | 0.54348 |
| 4 | −114.31185 | 0.121 | | | |
| 5 | 92.04970 | 4.526 | 1.85896 | 22.73 | 0.62844 |
| 6 | 123.65254 | 3.111 | | | |
| 7 | 182.66405 | 9.317 | 1.49700 | 81.54 | 0.53748 |
| 8 | −189.53129 | 0.120 | | | |
| 9 | 138.83666 | 2.200 | 1.89286 | 20.36 | 0.63944 |
| 10 | 105.26316 | 15.717 | | | |
| 11 | 95.23876 | 11.858 | 1.43875 | 94.66 | 0.53402 |
| 12 | −366.30535 | 0.120 | | | |
| 13 | 119.03776 | 2.200 | 1.84666 | 23.78 | 0.62054 |
| 14 | 55.65533 | 1.259 | | | |
| 15 | 58.16227 | 13.274 | 1.43875 | 94.66 | 0.53402 |
| 16 | −448.71196 | 0.120 | | | |
| 17 | 87.73215 | 5.635 | 1.92119 | 23.96 | 0.62025 |
| 18 | 338.25789 | DD[18] | | | |
| *19 | 2343.50595 | 2.000 | 1.90366 | 31.31 | 0.59481 |
| 20 | 35.24312 | 5.495 | | | |
| 21 | −141.35313 | 1.010 | 1.59410 | 60.47 | 0.55516 |
| 22 | 31.79797 | 2.347 | 1.95375 | 32.32 | 0.59015 |
| 23 | 44.79347 | 1.271 | | | |
| 24 | 50.99786 | 5.331 | 1.85025 | 30.05 | 0.59797 |
| 25 | −93.18999 | 3.405 | | | |
| 26 | −31.96941 | 1.001 | 1.69560 | 59.05 | 0.54348 |
| 27 | −84.24043 | DD[27] | | | |
| 28 | −75.60987 | 1.000 | 1.95375 | 32.32 | 0.59015 |
| 29 | 86.08540 | 3.018 | 1.89286 | 20.36 | 0.63944 |
| 30 | −330.73913 | DD[30] | | | |

TABLE 13B

Example 5

| Sn | R | D | Nd | vd | θgF |
|---|---|---|---|---|---|
| 31(St) | ∞ | 1.052 | | | |
| *32 | 242.43911 | 3.903 | 1.95375 | 32.32 | 0.59015 |
| 33 | −77.73478 | 0.120 | | | |
| 34 | 48.34305 | 10.581 | 1.55032 | 75.50 | 0.54001 |
| 35 | −139.34994 | 1.000 | 1.88300 | 40.69 | 0.56730 |
| 36 | 94.18521 | DD[36] | | | |
| 37 | 74.55414 | 6.291 | 1.48749 | 70.24 | 0.53007 |
| 38 | −92.69129 | 0.121 | | | |
| 39 | 35.31488 | 8.284 | 1.43875 | 94.66 | 0.53402 |
| 40 | −407.82860 | 0.011 | | | |
| 41 | 47.62501 | 1.000 | 1.95375 | 32.32 | 0.59015 |
| 42 | 20.83501 | 9.615 | 1.53172 | 48.84 | 0.56309 |
| 43 | 75.36152 | 2.979 | | | |
| 44 | −424.15056 | 6.338 | 1.59522 | 67.73 | 0.54426 |
| 45 | −24.58228 | 1.000 | 1.96300 | 24.11 | 0.62126 |
| 46 | 50.85543 | 12.000 | | | |
| 47 | 105.66464 | 6.940 | 1.89286 | 20.36 | 0.63944 |
| 48 | −98.23575 | 0.200 | | | |
| 49 | ∞ | 2.620 | 1.51633 | 64.14 | 0.53531 |
| 50 | ∞ | 39.400 | | | |

TABLE 14

Example 5

| | WIDE | TELE |
|---|---|---|
| Zr | 1.0 | 3.8 |
| f | 28.500 | 108.299 |
| FNo. | 2.76 | 2.77 |
| 2ω(°) | 81.2 | 23.6 |
| IH | 23.15 | 23.15 |
| DD[18] | 0.602 | 57.177 |
| DD[27] | 30.789 | 1.183 |
| DD[30] | 8.220 | 1.001 |
| DD[36] | 21.186 | 1.436 |

TABLE 15

Example 5

| Sn | 1 | 19 |
|---|---|---|
| KA | 1.0000000E+00 | 1.0000000E+00 |
| A3 | 0.0000000E+00 | 0.0000000E+00 |
| A4 | 3.5224447E−07 | 2.1484902E−06 |
| A5 | −2.9786159E−08 | 4.0787471E−08 |

TABLE 15-continued

Example 5

| A6 | 5.5055783E−09 | −6.5206453E−09 |
|---|---|---|
| A7 | −5.2425191E−10 | −7.5116429E−11 |
| A8 | 3.4987434E−11 | 1.3750852E−11 |
| A9 | −1.7982906E−12 | 1.8361774E−11 |
| A10 | 6.9278030E−14 | −1.7220163E−12 |
| A11 | −1.8152166E−15 | −1.4348971E−13 |
| A12 | 2.6607084E−17 | 2.7533588E−14 |
| A13 | −4.7729302E−20 | −1.3271973E−15 |
| A14 | −5.2605862E−21 | 1.1281959E−17 |
| A15 | 8.1671045E−23 | 7.9822695E−19 |
| A16 | −4.0566291E−25 | −1.6732247E−20 |
| A17 | 1.8336515E−30 | 0.0000000E+00 |
| A18 | 5.5852243E−32 | 0.0000000E+00 |
| A19 | 1.7478371E−33 | 0.0000000E+00 |
| A20 | −2.0975560E−35 | 0.0000000E+00 |

| Sn | 32 |
|---|---|
| KA | 1.0000000E+00 |
| A4 | −9.6245891E−07 |
| A6 | −1.4380540E−09 |
| A8 | 2.5394744E−11 |
| A10 | −2.4737707E−13 |
| A12 | 1.4389602E−15 |
| A14 | −5.1676940E−18 |
| A16 | 1.1221112E−20 |
| A18 | −1.3506704E−23 |
| A20 | 6.9189754E−27 |

Table 16 shows values corresponding to Conditional Expressions (1) to (4), (5A), (6A), (5B), (6B), and (7) of the zoom lenses of Examples 1 to 5. The values, related to a focal length, shown in Table 16 are based on the d line.

TABLE 16

| Expression No. | | Example 1 | Example 2 | Example 3 | Example 4 | Example 5 |
|---|---|---|---|---|---|---|
| (1) | vdp − vdn | 11.71 | 11.71 | 9.90 | 13.71 | 13.22 |
| (2) | vdn − vdpm | 3.03 | 3.03 | 6.66 | 8.54 | 8.37 |
| (3) | θn | 0.56197 | 0.56197 | 0.56197 | 0.56197 | 0.56730 |
| | θpm | 0.56679 | 0.56679 | 0.57813 | 0.58224 | 0.59015 |
| (4) | θn | 0.56197 | 0.56197 | 0.56197 | 0.56197 | 0.56730 |
| (5A) | f4 × (Σ(1/fpi) − \|1/fn\|) | 0.764 | 0.750 | 0.742 | — | — |
| (6A) | fw/f4 | 0.270 | 0.271 | 0.261 | — | — |
| (5B) | f4 × (Σ(1/fpi) − \|1/fn\|) | — | — | — | 0.897 | 0.852 |
| (6B) | fw/f4 | — | — | — | 0.465 | 0.515 |
| (7) | fw/f1 | 0.363 | 0.366 | 0.369 | 0.389 | 0.411 |

As can be seen from the data described above, the zoom lenses of Examples 1 to 5 secure a maximum image height of 23.15 and a large image circle while being downsized, and realize high optical performance with various aberrations, including a chromatic aberration and a spherical aberration, which are favorably suppressed.

Figure 12:
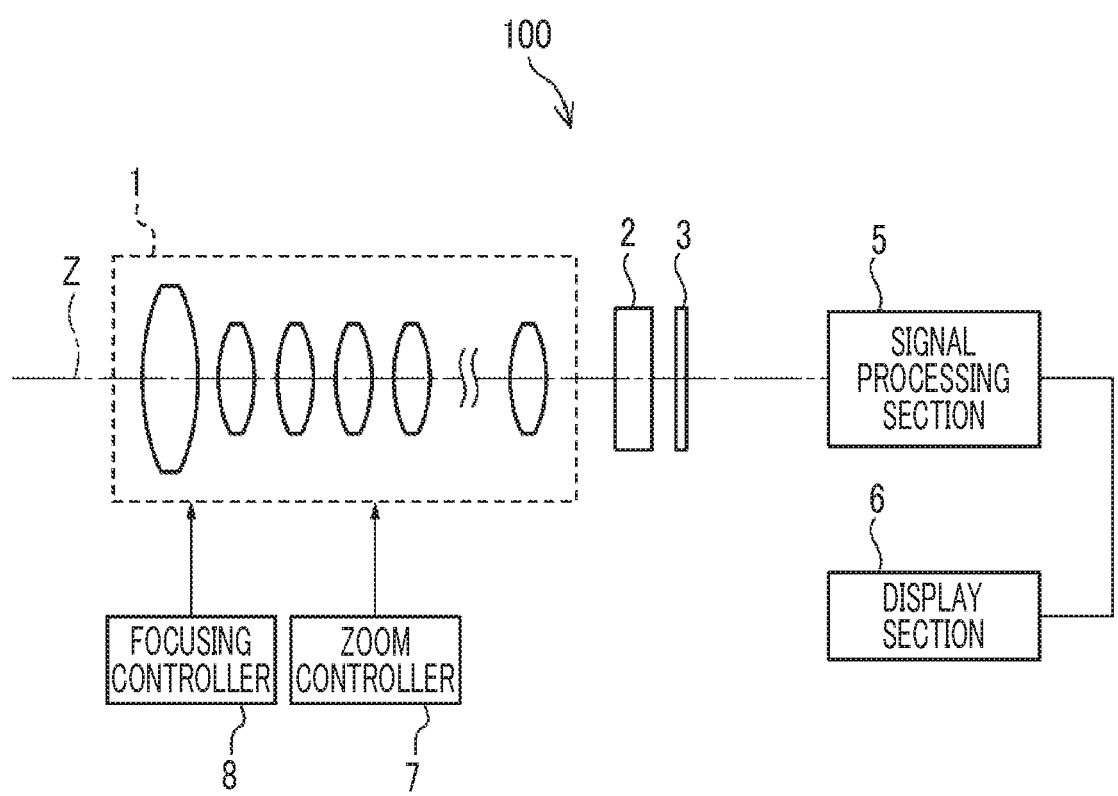
FIG. 12 is a schematic configuration diagram of an imaging apparatus according to an embodiment of the present disclosure.

Next, an imaging apparatus according to an embodiment of the present disclosure will be described. FIG. 12 is a schematic configuration diagram of an imaging apparatus 100 using the zoom lens 1 according to the above-mentioned embodiment of the present disclosure as an example of an imaging apparatus of an embodiment of the present disclosure. Examples of the imaging apparatus 100 include a broadcast camera, a movie camera, a video camera, a surveillance camera, and the like.

The imaging apparatus 100 comprises the zoom lens 1, a filter 2 disposed on an image side of the zoom lens 1, and an imaging element 3 disposed on an image side of the filter 2. Further, FIG. 12 schematically shows a plurality of lenses included in the zoom lens 1.

The imaging element 3 converts an optical image, which is formed through the zoom lens 1, into an electrical signal. For example, it is possible to use a charge coupled device (CCD), complementary metal oxide semiconductor (CMOS), or the like. The imaging element 3 is disposed such that the imaging surface thereof is coplanar with an image plane of the zoom lens 1.

The imaging apparatus 100 also comprises a signal processing section 5 that performs arithmetic processing on an output signal from the imaging element 3, a display section 6 that displays an image formed by the signal processing section 5, a zoom controller 7 that controls zooming of the zoom lens 1, and a focusing controller 8 that controls focusing of the zoom lens 1. Although only one imaging element 3 is shown in FIG. 12, a so-called three-plate imaging apparatus having three imaging elements may be used.

The technology of the present disclosure has been hitherto described through embodiments and examples, but the technology of the present disclosure is not limited to the above-mentioned embodiments and examples, and may be modified into various forms. For example, values such as the radius of curvature, the distance between surfaces, the refractive index, the Abbe number, and the aspheric coefficients of each lens are not limited to the values shown in the numerical examples, and different values may be used therefor.

What is claimed is:

1. A zoom lens consisting of, in order from an object side to an image side:
   a first lens group that has a positive refractive power;
   a second lens group that has a negative refractive power;
   a third lens group that has a refractive power;
   a fourth lens group that has a positive refractive power; and
   a fifth lens group that has a positive refractive power,
   wherein during zooming from a wide-angle end to a telephoto end, the first lens group and the fifth lens group remain stationary with respect to an image plane, the second lens group, the third lens group and the fourth lens group move along an optical axis while changing a distance with each of adjacent lens groups,
   wherein the fourth lens group includes at least two positive lenses and a negative lens disposed on a most-image-side, and
   wherein assuming that an average value of Abbe numbers of the positive lenses included in the fourth lens group based on a d line is vdp and an Abbe number of the negative lens disposed on a most-image-side of the fourth lens group based on a d line is vdn, the following Conditional Expression (1) is satisfied, $$0 < vdp - vdn < 15 \qquad (1).$$

2. The zoom lens according to claim 1,
   wherein assuming that a minimum value of Abbe numbers of the positive lenses included in the fourth lens group based on a d line is vdpm, the following Conditional Expression (2) is satisfied, $$0 < vdn - vdpm \qquad (2).$$

3. The zoom lens according to claim 2,
   wherein the following Conditional Expression (2-1) is satisfied, $$2 < vdn - vdpm < 10 \qquad (2\text{-}1).$$

4. The zoom lens according to claim 1,
   wherein assuming that a partial dispersion ratio between a g line and an F line of the negative lens disposed on a most-image-side of the fourth lens group is θn and a partial dispersion ratio between a g line and an F line of a positive lens having a smallest Abbe number based on a d line among the positive lenses included in the fourth lens group is θpm, the following Conditional Expression (3) is satisfied, $$\theta n < \theta pm \qquad (3).$$

5. The zoom lens according to claim 1,
   wherein assuming that a partial dispersion ratio between a g line and an F line of the negative lens disposed on a most-image-side of the fourth lens group is θn, the following Conditional Expression (4) is satisfied, $$0.54 < \theta n < 0.58 \qquad (4).$$

6. The zoom lens according to claim 5,
   wherein the following Conditional Expression (4-1) is satisfied, $$0.56 < \theta n < 0.57 \qquad (4\text{-}1).$$

7. The zoom lens according to claim 1, wherein the third lens group has a positive refractive power.

8. The zoom lens according to claim 7,
   wherein assuming that a total number of the positive lenses included in the fourth lens group is k, a number sequentially assigned to the positive lenses included in the fourth lens group in order from an object side is i, and a focal length of an i-th positive lens of the fourth lens group from an object side is fpi, a focal length of the negative lens disposed on a most-image-side of the fourth lens group is fn, and a focal length of the fourth lens group is f4, the following Conditional Expression (5A) is satisfied, $$0.6 < f4 \times \left\{ \left( \sum_{i=1}^{k} \frac{1}{fpi} \right) - \left| \frac{1}{fn} \right| \right\} < 0.8. \qquad (5A)$$

9. The zoom lens according to claim 8,
   wherein the following Conditional Expression (5A-1) is satisfied, $$0.68 < f4 \times \left\{ \left( \sum_{i=1}^{k} \frac{1}{fpi} \right) - \left| \frac{1}{fn} \right| \right\} < 0.78. \qquad (5A\text{-}1)$$

10. The zoom lens according to claim 7,
wherein assuming that a focal length of the fourth lens group is f4 and a focal length of the zoom lens at a wide-angle end in a state of being focused on an object at infinity is fw, the following Conditional Expression (6A) is satisfied, $$0.1 < fw/f4 < 0.6 \quad (6A).$$

11. The zoom lens according to claim 10,
wherein the following Conditional Expression (6A-1) is satisfied, $$0.2 < fw/f4 < 0.3 \quad (6A\text{-}1).$$

12. The zoom lens according to claim 1, wherein the third lens group has a negative refractive power.

13. The zoom lens according to claim 12,
wherein assuming that a total number of the positive lenses included in the fourth lens group is k, a number sequentially assigned to the positive lenses included in the fourth lens group in order from an object side is i, and a focal length of an i-th positive lens of the fourth lens group from an object side is fpi, a focal length of the negative lens disposed on a most-image-side of the fourth lens group is fn, and a focal length of the fourth lens group is f4, the following Conditional Expression (5B) is satisfied, $$0.8 < f4 \times \left\{ \left( \sum_{i=1}^{k} \frac{1}{fpi} \right) - \left| \frac{1}{fn} \right| \right\} < 1. \quad (5B)$$

14. The zoom lens according to claim 12,
wherein assuming that a focal length of the fourth lens group is f4 and a focal length of the zoom lens at a wide-angle end in a state of being focused on an object at infinity is fw, the following Conditional Expression (6B) is satisfied, $$0.1 < fw/f4 < 0.6 \quad (6B).$$

15. The zoom lens according to claim 1,
wherein a stop is disposed in the fourth lens group, and
wherein a distance between the fourth lens group and the fifth lens group at a wide-angle end is longer than a distance between the fourth lens group and the fifth lens group at a telephoto end.

16. The zoom lens according to claim 1,
wherein assuming that a focal length of the first lens group is f1 and a focal length of the zoom lens at a wide-angle end in a state of being focused on an object at infinity is fw, the following Conditional Expression (7) is satisfied, $$0.3 < fw/f1 < 0.5 \quad (7).$$

17. The zoom lens according to claim 1,
wherein a positive lens disposed on a most-image-side among the positive lenses included in the fourth lens group and the negative lens disposed on a most-image-side of the fourth lens group are cemented with each other.

18. The zoom lens according to claim 1,
wherein the number of the negative lenses included in the fourth lens group is one.

19. The zoom lens according to claim 1,
wherein the following Conditional Expression (1-1) is satisfied, $$5 < vdp - vdn < 15 \quad (1\text{-}1).$$

20. An imaging apparatus comprising the zoom lens according to claim 1.

* * * * *